United States Patent
Roh et al.

(10) Patent No.: US 12,214,486 B2
(45) Date of Patent: *Feb. 4, 2025

(54) MOVING ROBOT

(71) Applicant: LG ELECTRONICS INC., Seoul (KR)

(72) Inventors: Eunji Roh, Seoul (KR); Sunju Lee, Seoul (KR); Jina Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/204,103

(22) Filed: May 31, 2023

(65) Prior Publication Data

US 2023/0302654 A1    Sep. 28, 2023

Related U.S. Application Data

(63) Continuation of application No. 16/627,584, filed as application No. PCT/KR2018/007342 on Jun. 28, 2018, now Pat. No. 11,701,782.

(30) Foreign Application Priority Data

Jun. 30, 2017  (KR) .................. 10-2017-0083625

(51) Int. Cl.
*B25J 13/00*     (2006.01)
*B25J 9/16*      (2006.01)
*B25J 19/02*     (2006.01)
*B25J 19/04*     (2006.01)

(52) U.S. Cl.
CPC ............. *B25J 13/003* (2013.01); *B25J 9/161* (2013.01); *B25J 19/04* (2013.01); *B25J 19/023* (2013.01)

(58) Field of Classification Search
CPC . B25J 13/003; B25J 9/161; B25J 19/04; B25J 19/023; B25J 11/0005; B25J 13/08; B25J 19/026; B25J 11/008; B25J 9/1664; B25J 13/081; B25J 19/061
See application file for complete search history.

(56) References Cited

U.S. PATENT DOCUMENTS

| | | |
|---|---|---|
| 2012/0215380 A1 | 8/2012 | Fouillade et al. |
| 2015/0084861 A1 | 3/2015 | Cheon et al. |
| 2015/0096813 A1 | 4/2015 | Aumente |
| 2017/0280678 A1 | 10/2017 | Jones et al. |

(Continued)

FOREIGN PATENT DOCUMENTS

| | | |
|---|---|---|
| EP | 1 941 411 A2 | 7/2008 |
| KR | 2003-0004927 A | 1/2003 |

(Continued)

*Primary Examiner* — Harry Y Oh
(74) *Attorney, Agent, or Firm* — Birch, Stewart, Kolasch & Birch, LLP

(57) ABSTRACT

A moving robot includes a voice input unit configured to receive a voice input of a user; a first display capable of receiving a touch input; a second display larger than the first display; and a controller configured to perform control such that a screen to be displayed in response to the voice input or the touch input is displayed on at least one of the first display or the second display based on a type and an amount of information included in the screen. Accordingly, it is possible to provide information and services more effectively using the two displays.

13 Claims, 33 Drawing Sheets

(56) References Cited

U.S. PATENT DOCUMENTS

2017/0330479 A1   11/2017  Bowman et al.
2018/0043542 A1    2/2018  Mascorro Medina et al.

FOREIGN PATENT DOCUMENTS

| | | | |
|---|---|---|---|
| KR | 10-2008-0090150 | A | 10/2008 |
| KR | 10-2010-0006975 | A | 1/2010 |
| KR | 20100006975 | A * | 1/2010 |
| KR | 10-2011-0004015 | A | 1/2011 |
| KR | 20160104953 | A * | 2/2015 |
| KR | 10-1603873 | B1 | 3/2016 |
| KR | 102642621 | B1 * | 12/2016 |
| KR | 102660834 | B1 * | 12/2016 |
| KR | 102350934 | B1 * | 3/2017 |
| KR | 10-2018-0038671 | A | 4/2018 |
| KR | 10-2016-0104953 | A | 9/2018 |
| WO | WO 2007/041295 | A2 | 4/2007 |
| WO | WO 2012/091801 | A2 | 7/2012 |

\* cited by examiner

MOVING ROBOT

CROSS-REFERENCE TO RELATED APPLICATIONS

This application is a Continuation of copending application Ser. No. 16/627,584, filed on Dec. 30, 2019, which is the National Phase of PCT International Application No. PCT/KR2018/007342 filed on Jun. 28, 2018, which claims the benefit of priority to Korean Patent Application No. 10-2017-0083625 filed in the Republic of Korea on Jun. 30, 2017, all which are hereby expressly incorporated by reference into the present application.

TECHNICAL FIELD

The present invention relates to a moving robot and an operation method thereof, and more particularly to a moving robot capable of providing people with various guides and services in a public place and an operation method thereof.

BACKGROUND ART

Electronic displays, direction boards, etc. are used at airports, train stations, ports, department stores, and places for performance to provide users with information. However, such large screens, indicator displays, etc. provides information selected by a service provider in one way and is incapable of meeting demands of all individual users.

Meanwhile, kiosks which provides users with information and service with multimedia devices such as display means, touch screens, speakers, etc. are being increasingly introduced in more and more fields. However, users have to manipulate the kiosks on his/her own, so it may cause inconvenience if the users are not used to use the kiosks and the kiosks are not capable of actively responding a demand from a user.

Meanwhile, robots have been developed for industrial purposes and have taken charge of a portion of factory automation, and, in recent years, application fields of the robots have been expanded to thereby develop medical robots, aerospace robots, etc. and even domestic robots to be used at home are also being made.

Thus, there are increasing efforts to develop a method of providing various services in public places using robots.

Meanwhile, many electronic devices are equipped with display means and used as an information providing means and a touch input means. In addition, studies and research on electronic devices having two or more display means are ongoing as well.

An existing technology (Korean Patent Application Publication No. 10-2010-002192 (Publication Date: Feb. 26, 2010)) relates to a mobile terminal having at least two display areas and a method for controlling the same, and one display area is automatically controlled in according to a type of a control signal input to the mobile terminal having the at least two display areas.

However, the existing technology determines a display to be turned on according to reception of a touch input, a moving direction of the mobile terminal, movement intensity, a moving speed, the number of times of movement, and a pattern of movement, but the existing technology fails to enhance efficiency in providing information by combining the two displays.

DISCLOSURE

Technical Problem

One object of the present invention is to provide a moving robot and an operation method thereof, the moving robot capable of providing a variety of services including a guide service in a public place.

Another object of the present invention is to provide a moving robot and an operation method thereof, the moving robot capable of conveniently providing information displayed on a display in the course of providing a service, such as a wayfinding service.

Yet another object of the present invention is to provide a moving robot and an operation method, the moving robot capable of utilizing two displays in various manners according to a type of information, an amount of information, an interaction distance between the robot and a user, and sizes of the displays, thereby enabled to enhance efficiency in providing information and improve user convenience.

Technical Solution

In order to achieve the aforementioned objects and other objects not mentioned, a moving robot according to one aspect of the present invention includes: a voice input unit configured to receive a voice input of a user; a first display capable of receiving a touch input; a second display larger than the first display; and a controller configured to perform control such that a screen to be displayed in response to the voice input or the touch input is displayed on at least one of the first display or the second display based on a type and an amount of information included in the screen, and accordingly, it is possible to provide information and services more effectively using two displays.

Advantageous Effects

According to at least one of embodiments of the present invention, it is possible to provide various services such as a guide service in a public place.

In addition, according to at least one of embodiments of the present invention, it is possible to conveniently provide information displayed on a display in the course of providing a service such as a wayfinding service.

In addition, according to at least one of embodiments of the present invention, two displays are utilized in various manners according to a type of information, an amount of information, an interaction distance between the robot and a user, and sizes of the displays, thereby enhancing efficiency in providing information and improving user convenience.

Meanwhile, other effects of the present invention will be explicitly or implicitly disclosed in the following description.

BEST MODE

Figure 1:
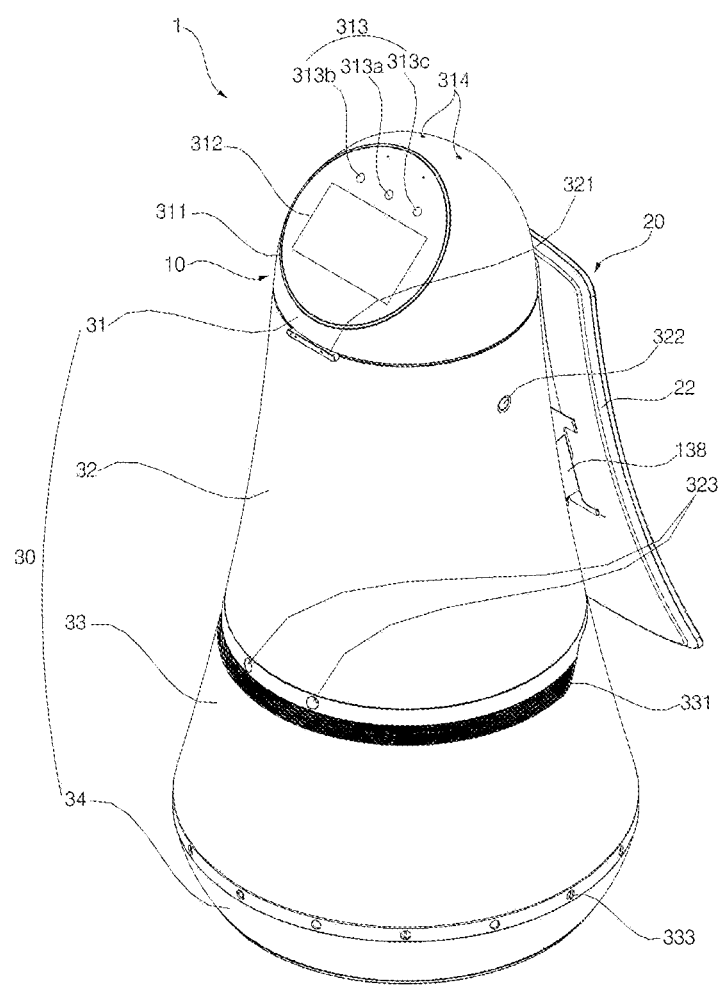
FIG. 1 is a perspective view of a moving robot according to an embodiment of the present invention.

Hereinafter, exemplary embodiments of the present invention will be described in detail with reference to the accompanying drawings. However, the present invention is not limited to the exemplary embodiments described herein and may be embodied in various forms.

In the drawings, to clearly and briefly explain the present invention, illustration of elements having no connection with the description is omitted, and the same or extremely similar elements are designated by the same reference numerals throughout the specification.

Meanwhile, a suffix such as "module" and "unit" may be used to refer to elements or components, and use of such a suffix herein is merely intended to facilitate description of the specification and not intended to give any special meaning or function. Thus, the "module" and "unit" may be used interchangeably.

Figure 2:
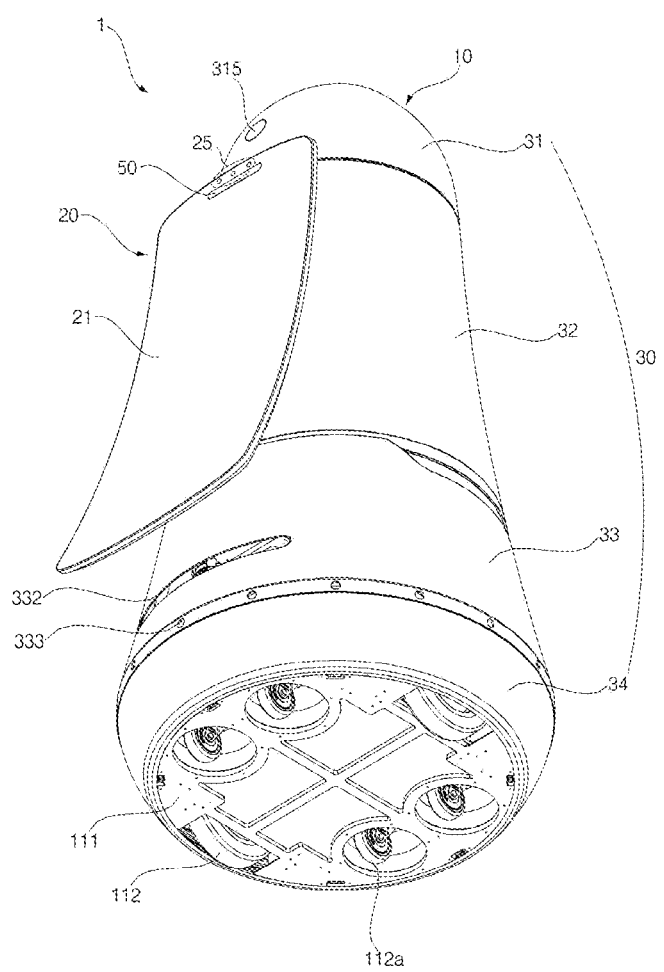
FIG. 2 is a bottom perspective view of the moving robot seen from the bottom thereof.
Figure 3:
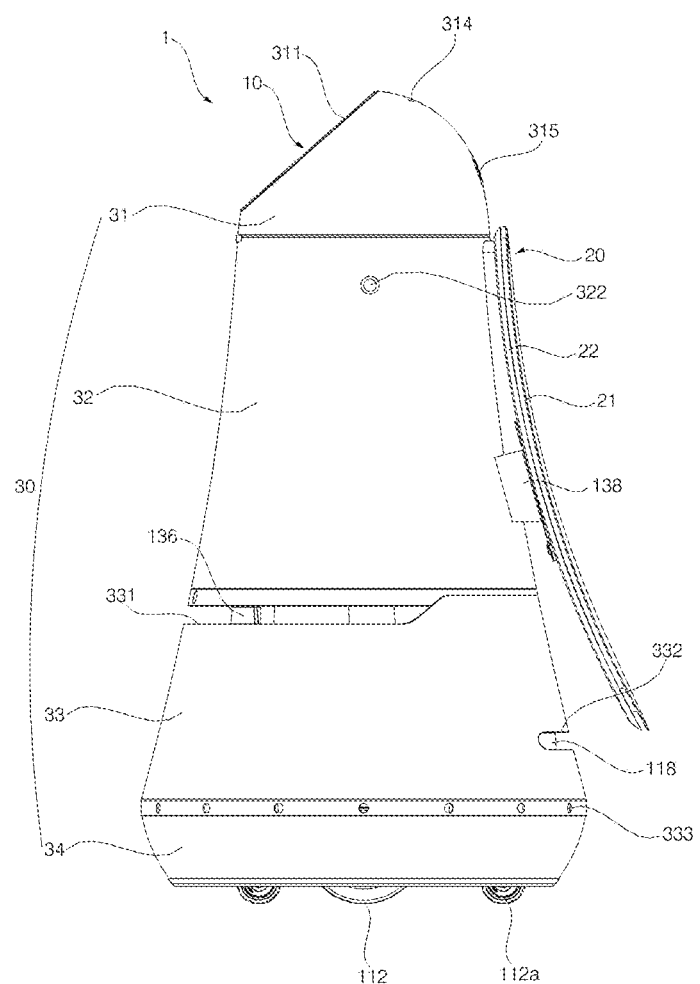
FIG. 3 is a side view of the moving robot.
Figure 4:
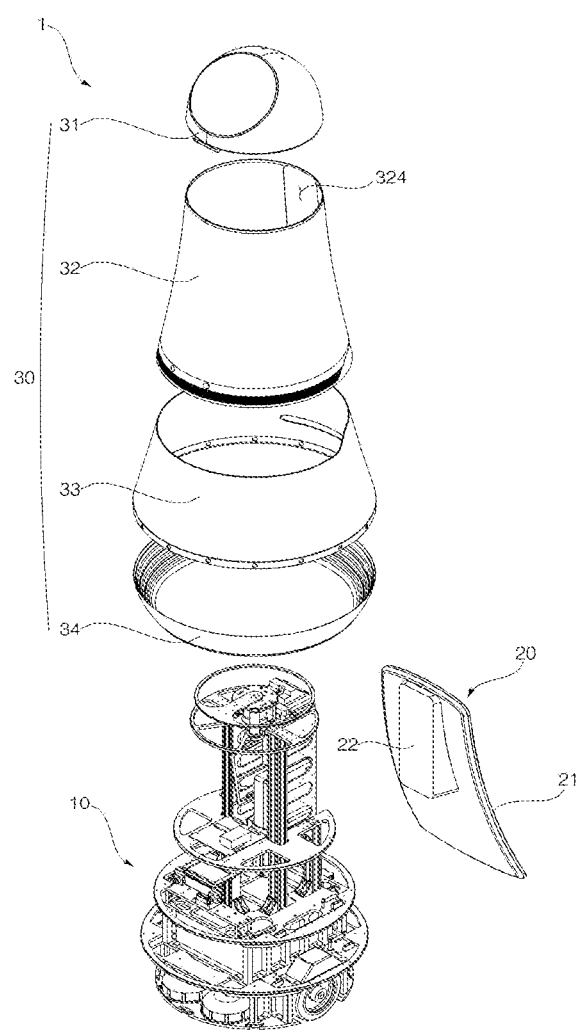
FIG. 4 is an exploded perspective view of the moving robot.

FIG. 1 is a perspective view of a moving robot according to an embodiment of the present invention, FIG. 2 is a bottom perspective view of the moving robot seen from the bottom thereof, FIG. 3 is a side view of the moving robot, and FIG. 4 is an exploded perspective view of the moving robot.

Referring to FIGS. 1 to 4, a moving robot 1 according to an embodiment of the present invention may include a main body 10 forming an external appearance of the moving robot 1 and holding a variety of components therein.

The main body 10 may be formed with a long length in an upward and downward direction, and has a shape that becomes further slimmer in a direction from bottom to top.

The main body 10 may include a case 30 forming an external appearance of the moving robot 1. The case 30 may include a top cover 31 disposed on the top, a first middle cover 32 positioned below the top cover 31, a second middle cover 33 positioned below the first middle cover 32, and a bottom cover 34 positioned below the second middle cover 33. The first middle cover 32 and the second middle cover 33 may be formed as one middle cover.

The top cover 31 may be positioned at the top of the moving robot 1, and has a hemispherical or dome shape. The top cover 31 may be positioned at a height lower than an adult height so as to easily receive a command from a user. In addition, the top cover 31 may be able to rotate by a predetermined angle.

Meanwhile, the top cover 31 and a head part 15 within the top cover may be disposed at the top of the moving robot 1 and similar in shape and function with a human head to take responsibilities for interaction with a user. Therefore, the top cover 31 and the head part 15 within the top cover 31 may be called a head. In addition, other part below the head may be called body.

The top cover 31 may include a manipulation unit 311 disposed on one side of a front surface of the top cover 31. The manipulation unit 311 may serve to receive a command from a user. To this end, the manipulation unit 311 may include a display 312 to receive a touch input from the user.

The display 312 included in the manipulation unit 311 may be called a first display or head display 312, and a display included in a display unit 20 disposed in the body may be called a second display or body display 21.

The head display 312 may form an interlayer structure with a touch pad to be implemented as a touch screen. In this case, the head display 312 may be used as not just an output device, but also as an input device which allows information to be input by a user's touch.

In addition, the manipulation unit 311 may be directed upward by a predetermined angle so that the user is allowed to easily operate the head display 312 while looking down at the head display 312. For example, the manipulation unit 311 may be disposed on a surface formed by cutting a portion of the top cover 31. Accordingly, the head display 312 may be disposed with inclination.

In addition, the manipulation unit 311 may have an overall circular or elliptical external appearance. The manipulation unit 311 may be realized in a shape similar to a human face.

For example, the manipulation unit 311 may have a circular shape, and one or more structures may be placed on the manipulation unit 311 to represent eyes, a nose, lips, eye brows, etc. of a human.

That is, a specific structure may be placed on the manipulation unit 311 to represent eyes, a nose, lips, eyebrows, etc. of a human, or a specific paint color may be coated. Accordingly, since the manipulation unit 311 has a human face-like shape, a user may feel empathy for the robot. Furthermore, if a robot having a human face-like shape travels, people may feel like a human is moving around, and thus uncomfortable and awkward feeling for the robot may be alleviated.

In another example, one or more images may be displayed on the head display 312 to represent eyes, a nose, lips, eyebrows, etc. of a human.

That is, the head display 312 may display not just information relating to a wayfinding service but also various images representing a human face. In addition, the head display 312 may display an image to represent a predetermined facial expression at a predetermined time interval or at a specific time.

Meanwhile, a direction in which the manipulation unit 311 faces in FIG. 1 is defined as a "forward direction". A direction opposite to the "forward direction" is defined as a "rearward direction".

In addition, a head camera unit 313 may be disposed in the manipulation unit 311 to recognize a human and an object.

The head camera unit 313 may be disposed above the head display 312. The head camera unit 313 may include a 2D camera 313*a*, and an RGBD sensor 313*b* and 313*c*.

The 2D camera 313*a* may be a sensor for recognizing a human or an object based on a 2D image.

In addition, the RGBD (Red, Green, Blue, Distance) sensor 313*b* and 313*c* may be a sensor for acquiring a position or a face image of a human. The RGBD sensor 313*b* and 313*c* may be a sensor for detecting a human or an object using captured images having depth data acquired from a camera RGBD sensors or any similar 3D imaging device.

In order to precisely detect a position or a face image of a human, the RGBD sensor 313*b* and 313*c* may be comprised in plural. For example, the RGBD sensor 313*b* and 313c may be configured as two sensors respectively disposed on the left side and the right side of the 2D camera 313a.

Although not illustrated in the drawings, the manipulation unit 311 may further include a physical button to receive a command directly from a user.

In addition, the top cover 31 may further include a microphone 314.

The microphone 314 may serve to receive a command of an audio signal from a user. For example, to precisely receive a voice command from the user, the microphone 314 may be formed at four places at a certain portion of an upper side of the top cover 31. Accordingly, even when the moving robot 1 is traveling or the top cover 31 is rotating, it is possible to receive a wayfinding request from a user through a voice.

In one embodiment of the present invention, while the moving robot 1 travels, the top cover 31 may rotate so that the manipulation unit 311 is directed in a traveling direction. When a command (e.g., a voice command or the like) is received from a user while the moving robot 1 travels, the top cover 31 may rotate so that the manipulation unit 311 is directed in a direction in which the user is positioned.

In contrast, when a command is received from a user while the moving robot 1 travels, the top cover 31 may rotate in a direction opposite to a traveling direction of the moving robot 1. That is, the top cover 31 may rotate in a direction in which the body display unit 20 is directed. Accordingly, the user is capable of effectively operating the manipulation unit 311 while viewing navigation service information displayed on the body display unit 20.

Figure 5:
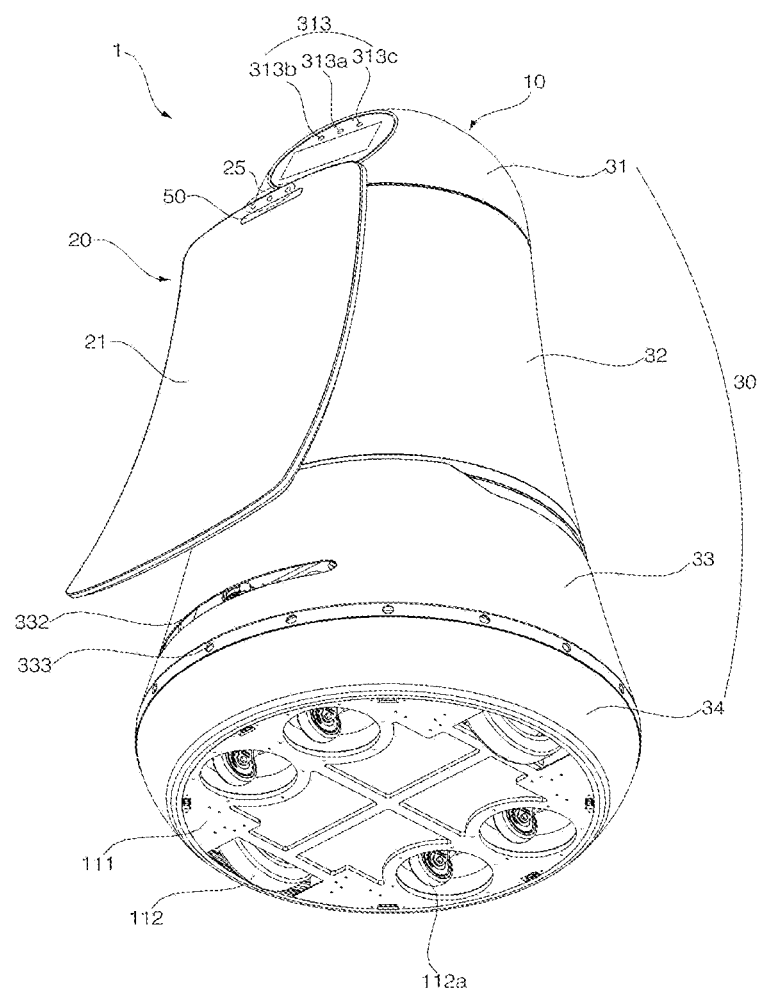
FIG. 5 is a diagram in which displays of a moving robot are aligned according to an embodiment of the present invention.

FIG. 5 is a diagram in which displays 312 and 20 of the moving robot 1 are aligned according to an embodiment of the present invention.

Referring to FIG. 5, when receiving or awaiting a command from a user, the moving robot may align the displays 312 and 20 in one direction so that a user or multiple users in a public place are able to more easily view information displayed on the two displays 312 and 20.

Meanwhile, the manipulation unit 311 and the body display 20 may be directed in different directions. In this case, for example, the manipulation unit 311 may be directed in one direction and the display unit 20 may be directed in the other direction, and thus, information displayed on the manipulation unit 311 or the body display unit 20 may be able to be seen from both directions.

Preferably, while the moving robot 1 travels or is stopped, the directions in which the manipulation unit 311 and the body display unit 20 are directed may be changed.

For example, in the case where the moving robot 1 is traveling, the manipulation unit 311 and the body display unit 20 may be directed in opposite directions, as shown in FIG. 1.

In addition, in the case where the moving robot 1 is in the standby state, the manipulation unit 311 and the body display unit 20 may be directed in the same direction, as shown in FIG. 5.

In addition, the top cover 31 may further include an emergency button 315. The emergency button 315 may serve to instantly stop the moving robot 1 while the moving robot 1 is stopped or traveling. For example, the emergency button 315 may be disposed in the rear of the moving robot 1 so as to easily operate the emergency button 315 even when the moving robot 1 travels in the forward direction.

The first middle cover 32 may be positioned below the top cover 31. Various electronic components including a substrate may be placed within the first middle cover 33. In addition, the first middle cover 32 may have a cylindrical shape having a diameter that increases from top to bottom.

More preferably, the first middle cover 32 may include an RGBD sensor 321.

The RGBD sensor 321 may serve to sense a collision between the moving robot 1 and an obstacle while the moving robot 1 travels. To this end, the RGBD sensor 321 may be disposed in a traveling direction of the moving robot 1, that is, in the front of the first middle cover 32. For example, the RGBD sensor 321 may be disposed at an upper end of the first middle cover 32 in consideration of a height of an obstacle or human existing in front of the moving robot 1. However, aspects of the present invention are not limited thereto, and the RGBD sensor 321 may be disposed at any of various positions in the front of the first middle cover 32.

In some embodiments, the RGBD sensor 321 may not be disposed on the first middle cover 32 and the function of the RGBD sensor 321 may be performed by the head camera unit 313.

In addition, the first middle cover 32 may further include a speaker hole 322.

The speaker hole 322 may be a hole to deliver sound generated by a speaker. The speaker hole 322 may be formed on an outer circumferential surface of the first middle cover 32 and may be formed in singular. In contrast, the speaker hole 322 may be formed in plural and spaced apart from each other on the outer circumferential surface of the first middle cover 32.

In addition, the first middle cover 32 may further include a stereo camera hole 323.

The stereo camera hole 323 may be a hole to operate a stereo camera 137 (see FIG. 6) installed in a main body 10. For example, the stereo camera hole 323 may be formed at a front bottom of the first middle cover 32. Accordingly, the stereo camera 137 is able to photograph an area in front of the moving robot 1.

The second middle cover 33 may be positioned below the first middle cover 32. A battery, a Light Detection and Ranging (Lidar) required for autonomous traveling, etc. may be disposed within the second middle cover 33. Similar to the first middle cover 32, the second middle cover 33 may have a cylindrical shape having a diameter that increases from top to bottom. In addition, an outer side of the second middle cover 33 may be connected to an outer side of the first middle cover 32 without forming a step. That is, the outer side of the second middle cover 33 and the first middle cover 32 may be connected seamlessly, thereby making the external appearance more aesthetic.

In addition, since the first middle cover 32 and the second middle cover 33 have a cylindrical shape having a diameter that increases from top to bottom, an overall roly-poly toy shape may be achieved. Accordingly, it is possible to alleviate impact occurring upon when the main body 10 collides with a person or an obstacle.

Specifically, the second middle cover 33 may include a first cut-open portion 331.

The first cut-open portion 331 may be formed from a front section to a side section on an outer circumferential surface of the second middle cover 33. The first cut-open portion 331 is a portion of the second middle cover 33 that is cut to allow a front lidar 136, which will be described later, to operate.

Specifically, the first cut-open portion 331 may be formed by cutting the front section of the outer circumferential surface of the second middle cover 33 by a predetermined length. Here, the front lidar 136 is disposed within the second middle cover 33. In addition, the first cut-open portion 331 may be formed by cutting the front section of the outer circumferential surface of the second middle cover 33 corresponding to a position of the front lidar 136 along a circumference of the second middle cover 33. That is, the first cut-open portion 331 and the front lidar 136 may face each other. Accordingly, the front lidar 136 may be exposed to the outside through the first cut-open portion 331.

For example, the first cut-open portion 331 may be formed by cutting the front of the first middle cover 33 by 270 degrees along the circumference of the second middle cover 33. The first cut-open portion 331 should be formed in the second middle cover 33 in order to prevent a laser beam emitted from the front lidar 136 from being irradiated directly into eyes of an adult or eyes of a child.

In addition, the second middle cover 33 may further include a second cut-open portion 332.

The second cut-open portion 332 may be formed from a rear section to a side section on the outer circumferential surface of the second middle cover 33. The second cut-open portion 332 is a portion of the second middle cover 33 that is cut to allow a rear lidar 118, which will be described later, to operate.

Specifically, the second cut-open portion 332 may be formed by cutting a rear section of the outer circumferential surface of the second middle cover 33 by a predetermined length in a radius direction. Here, the rear lidar 118 is disposed within the second middle cover 33. In addition, the second cut-open portion 332 may be formed by cutting the rear section of the outer circumferential surface of the second middle cover 33 corresponding to a position of the rear lidar 118 along the circumference of the second middle cover 33. Accordingly, the rear lidar 118 may be exposed to the outside through the second cut-open portion 332. For example, the second cut-open portion 332 may be formed by cutting the rear of the second middle cover 33 by 130 degrees along the circumference of the second middle cover 33.

In this embodiment, the first cut-open portion 331 and the second cut-open portion 332 may be spaced apart from each other in an upward and downward direction so as not to be connected to the second cut-open portion 332. In addition, the first cut-open portion 331 may be positioned above the second cut-open portion 332.

If the first cut-open portion 331 and the second cut-open portion 332 are positioned on the same plane, a laser beam emitted from one moving robot may be irradiated to a lidar of the other moving robot. Then, a laser beam emitted from each moving robot may cause interruption, making it difficult to detect a distance accurately. In this case, it is not possible to detect a distance between a moving robot and an obstacle, and thus, the moving robot may not travel properly and may possibly collide with the obstacle.

In addition, the second middle cover 33 may further include an ultrasonic sensor 333 disposed thereon.

The ultrasonic sensor 333 may be a sensor to measure a distance between an obstacle and the moving robot 1 using an ultrasound signal. The ultrasonic sensor 333 may serve to sense an obstacle in proximity to the moving robot 1.

For example, the ultrasonic sensor 333 may be provided in plural in order to sense obstacles in all directions in proximity of the moving robot 1. In addition, the plurality of ultrasonic sensors 333 may be spaced apart from each other along a bottom circumference of the second middle cover 33.

The bottom cover 34 may be positioned below the second middle cover 33. A wheel 112, a caster 112a, etc. may be disposed within the bottom cover 34. Unlike the first middle cover 32 and the second middle cover 33, the bottom cover 34 may have a cylindrical shape having a diameter that decreases from top to bottom. That is, the main body 10 has an overall roly-poly toy shape to reduce impact applied upon a collision, and the bottom of the main body 10 has an inward structure to prevent a human's feet from pressed by a wheel of the robot.

Specifically, a base 111 may be disposed within the bottom cover 34.

The base 111 may form a bottom surface of the moving robot 1.

In addition, a wheel 112 may be provided on the base 111 to drive the moving robot 1. The wheel 112 may be provided in one on each of the left side and the right side of the base 111.

In addition, the caster 112a may be provided on the base 111 to assist traveling of the moving robot 1. Here, the caster 112a may be provided in plural for manual movement of the moving robot 1. For example, the caster 112a may be provided in two at each of the front and the rear of the base 111.

According to the aforementioned caster structure, there is an advantage in that the moving robot 1 is able to be pushed with a moderate force when the moving robot 1 is power off or when the moving robot 1 has to be moved manually.

The body display unit 20 may be elongated on one side of the moving robot 1 in the upward and downward direction.

Specifically, the body display unit 20 may include a body display 21 and a support portion 22.

The body display 21 may be disposed in the rear of the first middle cover 32. The body display 21 may serve to output time information relating to a currently provided service (e.g., airport gate query information, wayfinding service information, etc.)

In addition, the body display 21 may be configured as a curved display that has a shape curved outward with a predetermined curvature. That is, the body display 21 may have an overall concave shape. In addition, the body display 21 may have a shape having a slope that increase from top to bottom. In other words, the body display 21 may be formed to gradually become distal from the case 30 in a direction from top to bottom.

According to the aforementioned display unit structure, there is an advantage in that information displayed on the body display 21 is able to be seen clearly even from a position far from the moving robot 1 and such information displayed on the body display 21 is able to be seen without distortion at various angles.

In addition, according to an embodiment of the present invention, the moving robot 1 may move ahead of a user along a set path to guide the user to a desired location. While following the moving robot 1, the user is able to see the body display unit 20 installed in the rear of the moving robot 1. That is, even when the moving robot 1 travels to guide the user to the desired location, the user is able to easily see information displayed o the display unit 20 while following the moving robot 1.

In addition, an upper end of the body display 21 may extend to an upper end of the first middle cover 32, and a lower end of the body display 21 may extend to the second cut-open portion 332. In the present embodiment, the lower end of the body display 21 should be formed not to go over the second cut-open portion 332. If the body display 21 is formed to cover the second cut-open portion 332, a laser beam emitted from the rear lidar 118 may hit the lower end of the body display 21. As a result, the moving robot 1 may be not capable of detecting a distance to an obstacle located in rear thereof.

Meanwhile, the support portion 22 may serve to maintain the body display 21 to be positioned in the rear of the first middle cover 32. The support portion 22 may extend on a rear surface of the body display 21. The support portion 22 may be elongated on the rear surface of the body display 21 in the upward and downward direction, and may protrude further in a direction from top to bottom.

In addition, the support portion 22 may penetrate the rear of the first middle cover 32 to be inserted into the first middle cover 32. To this end, a through-hole 324 to be penetrated by the support portion 22 may be formed in the rear of the first middle cover 32. The through hole 324 may be formed by cutting a portion of a rear circumferential surface of the first middle cover 32.

In addition, the body display 20 may be fixed to the main body 10 by a separate fixing member 138.

The fixing member 138 may be provided within the main body 10 to fix the body display unit 20 to the main body 10. One side of the fixing member 138 may be fixed to the main body 10, and the other side thereof may be fixed to the body display unit 20. To this end, the other side of the fixing member 138 may penetrate the through-hole 324 to protrude out of the case 30. That is, the support portion 22 and the fixing member 138 may be positioned in the through-hole 324.

In the present embodiment, the body display unit 20 may be fastened to the fixing member 138 by a fastening means. In this case, the support portion 22 of the body display unit 20 may be placed on an upper side of the fixing member 138. In other words, an extension part is placed on the upper side of the fixing member 138 and part of the fixing member 138 may be fixed to part of the body display unit 20. Due to the display unit fixing structure, the body display unit 20 may be stably positioned in the rear of the first middle cover 32.

Meanwhile, the body display unit 20 may further include a ticket insertion slot 50. In the present embodiment, an example in which the ticket insertion slot 50 is disposed in the body display unit 20 is shown, but aspects of the present invention are not limited thereto, and the ticket insertion slot 50 may be disposed at a different position in the moving robot 1.

According to an embodiment of the present invention, if a ticket such as a boarding pass, etc. is inserted into the ticket insertion slot 50, the moving robot 1 may scan a barcode, a QR code, etc. included in the ticket.

In addition, the moving robot 1 may display a scan result on the body display 21, and provide a user with gate information, counter information, etc. according to the scan result.

Meanwhile, the body display unit 20 may further include a body camera unit 25 to identify and track a subject to guide.

The body camera unit 25 may be configured as a 3D sensor such as RGBD camera sensor, etc., and sense presence of a subject to guide in a guide mode, a distance to the moving robot 1, speed, etc.

In some embodiments, the moving robot 1 may not include the body camera unit 25, and instead may further include a sensor disposed at a different position to identify and track a subject to guide.

Figure 6:
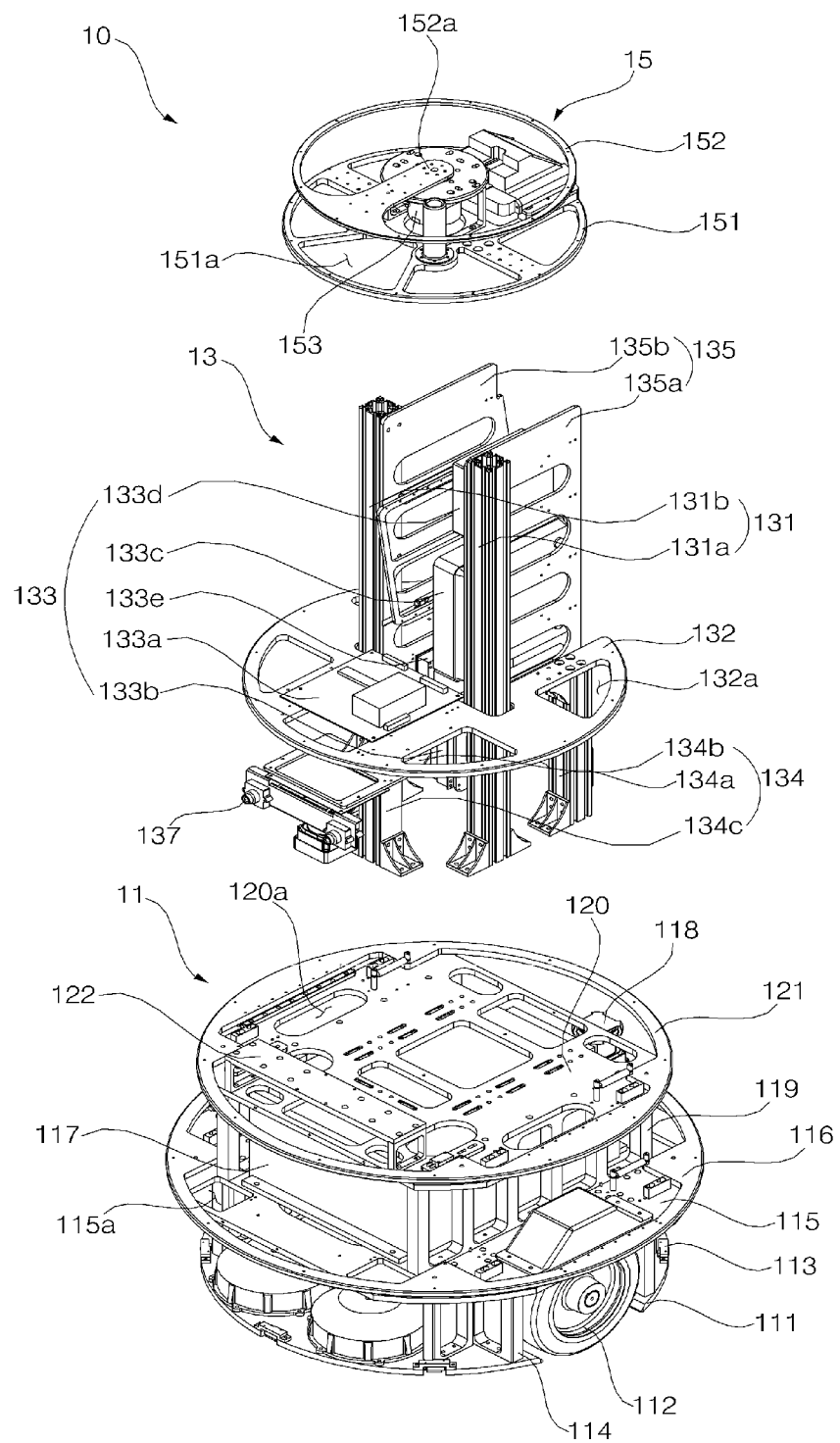
FIG. 6 is an exploded perspective view of a moving robot according to an embodiment of the present invention.

FIG. 6 is an exploded perspective view of the moving robot.

Referring to FIG. 6, a main body 10 according to the present invention may include a driving unit 11. The driving unit 11 may include a plurality of components required for traveling of the moving robot 1.

Specifically, the driving unit 11 may include a base 111. The base 111 may form a bottom surface of the moving robot 1.

The base 111 may have a circular plate shape and may be disposed within the bottom cover 34.

In addition, the driving unit 11 may further include a wheel 112 for traveling of the moving robot 1, and a motor (not shown) for transferring a driving force to the wheel 112. The wheel 112 may rotate by the driving force transferred from the motor. The wheel 112 may be provided as a pair of wheels respectively disposed on the left side and the right side of the base 111. In addition, the motor may be provided as a pair of motor respectively coupled to the pair of wheels 112. However, aspects of the present invention are not limited thereto, and the motor may be provided as a single motor to drive the pair of wheels 112.

Meanwhile, the moving robot 1 may further include a cliff sensor 113.

The cliff sensor 113 may be a sensor to sense presence of a sheer drop or a cliff in all directions of 360 degrees in a traveling range of the moving robot 1. The cliff sensor 113 may include a plurality of cliff sensors.

For example, the plurality of cliff sensors 113 may be spaced apart from each other along a periphery of the base 111.

In addition, the cliff sensor 113 may be disposed along an area adjacent to a front lidar 136 and a first cut-open portion 331 to look down forward. Accordingly, it is possible to sense presence of a cliff or a child coming ahead.

In addition, the driving unit 11 may further include a first support rib 114. The first support rib 114 may support a first support plate 115 which will be described later. The first support rib 114 may extend upward from an upper surface of the base 111. For example, the first support rib 114 may extend upward at a peripheral portion of the base 111. The first support rib 114 may include a plurality of first support ribs, and some of the plurality of first support ribs 114 may be empty therein or concave on one side thereof in order to minimize a weight thereof.

In the present embodiment, two first support ribs 114 may be disposed to be connected in the shape of "¬". However, aspects of the present invention are not limited thereto, and the first support ribs 114 may be disposed at various positions with various shapes.

In addition, the driving unit 11 may further include the first support plate 115.

The first support plate 115 may be disposed on an upper side of the first support rib 114. The first support plate 115 may have a plate shape. In addition, the first support plate 115 may include a weight reducing hole 115a to minimize a weight thereof. The weight reducing hole 115a may be formed in plural spaced apart from each other on an upper surface of the first support plate 115.

In addition, the driving unit 11 may further include a first bumper 116. When an external impact is applied, the first bumper 116 may move in a forward and rearward direction to absorb a predetermined amount of the impact. The first bumper 116 may be formed in a hollow ring shape, and disposed on the upper surface of the first support plate 115.

In addition, the driving unit 11 may further include a battery 117.

The battery 117 may provide power to drive the moving robot 1. The battery 117 may be disposed at a central portion on the upper surface of the first support plate 115 by taking into account the center of gravity of the moving robot 1.

Since the battery 117 accounts for a large proportion of the total weight of the moving robot, it is desirable that the battery 117 is positioned at a lower portion in the main body 10.

In addition, a rear lidar 118 may be disposed in the driving unit 11.

The rear lidar 118 may be a laser lidar that is a sensor configured to irradiate a laser beam, collect rearwardly scattered lights from lights absorbed by aerosol or scattered, analyze the collected lights so as to recognize a position. The rear lidar 118 may be disposed at the rear of the first support plate 115. That is, the rear lidar 118 may be disposed to face rearward of the moving robot 1. The rear lidar 118 may be exposed to the outside through the second cut-open portion 332 formed in the second middle cover 33.

In addition, the driving unit 11 may further include a second support rib 119. The second support rib 119 may support a second support plate 120 which will be described later. The second support rib 119 may extend upward from the upper surface of the first support plate 115.

Specifically, the second support rib 110 may be formed at a peripheral portion of the battery 117. For example, the second support rib 119 may be spaced apart from each other on both sides of the battery 117. The second support rib 119 may be formed as a plurality of second support ribs 119 in order to increase a supporting force, and upper ends of the plurality of second support ribs 119 may be connected. That is, the second support ribs 119 may have an arch shape. However, aspects of the present invention are not limited thereto, and the second support ribs 119 may be formed in various shapes.

In addition, the driving unit 11 may further include the second support plate 120. The second support plate 120 may be placed on an upper side of the second support rib 119. The second support plate 120 may have a plate shape. In addition, the second support plate 120 may include a weight reducing hole 120a to minimize a weight thereof. The weight reducing hole 120a may be formed in plural spaced apart from each other on the upper surface of the second support plate 120.

In addition, the driving unit 11 may further include a second bumper 121. Similar to the first bumper 116, when an external impact is applied, the second bumper 121 may move in the forward and rearward direction in order to absorb a predetermined amount of the impact. The second bumper 121 may be formed in a ring shape and disposed on the upper surface of the second support plate 120.

In addition, the driving unit 11 may further include a height adjustment rib 122. The height adjustment rib 122 may provide a predetermined height to a front lidar 136 which will be described later. That is, the height adjustment rib 122 may be disposed on a lower side of the front lidar 136 so as to match a height of the front lidar 136 and a height of the first cut-open portion 331. The height adjustment rib 122 may extend upward from the front of the upper surface of the second support plate 120.

Meanwhile, the main body 10 may further include a body part 13. The body part 13 may be disposed above the driving unit 11, and provided with various substrates 133 on which circuits are mounted to control overall operations of the moving robot 1. In the present embodiment, the substrates 133 may include a first substrate 133a, a second substrate 133b, a third substrate 133c, a fourth substrate 133d, and a fifth substrate 133e.

Specifically, the body part 13 may include a main frame 131. The main frame 131 may support the body display unit 20 and a head part 15 which will be described later. The main frame 131 may include a first main frame 131a and a second main frame 131b. The first main frame 131a and the second main fame 131b may have a pillar shape that extends in the upward and downward direction. In addition, the first main frame 131a and the second main frame 131b may be fixed to the upper surface of the second support plate 120.

For example, the first main frame 131a and the second main frame 131b may be spaced apart from each other at an equal distance from the center of the second support plate 120. That is, the first main frame 131a and the second main frame 131b may be horizontally symmetric with respect to the center of the second support plate 120. The head part 15 may be coupled to upper ends of the first main frame 131a and the second main frame 131b.

In addition, the body part 13 may further include a third support plate 132. The third support plate 132 may be penetrated by the first main frame 131 to be fitted into a certain portion of the main frame 131. The third support plate 132 may be positioned below a line dividing the main frame 131 into two equal parts. The third support plate 132 may have a shape of a circular plate, and include a weight reducing hole 132a to minimize a weight thereof.

In addition, the body part 13 may further include the first substrate 133a. The first substrate 133a may be disposed on an upper surface of the third support plate 132. The first substrate 133a may be, for example, an Application Processor (AP) board. The AP board may serve to manage an entire hardware module system of the moving robot 1, that is, a controller 740 (see FIG. 7).

In addition, the body part 13 may further include a subframe 134. The subframe 134 may be formed below the third support plate 132 so as to support the third support plate 132. The subframe 134 may be formed with a position lower than a position of the main frame 131b.

Specifically, the subframe 134 may include a first subframe 134a and a second subframe 134b. The first subframe 134a and the second subframe 134b may have a pillar shape that extends in the upward and downward direction. In addition, the first subframe 134a and the second subframe 134b may be fixed to the upper surface of the second support plate 120.

The first subframe 134a and the second subframe 134b may be disposed adjacent to the main frame 131. For example, the first subframe 134a and the second subframe 134b may be respectively spaced apart from the first main frame 131a and the second main frame 131b at an equal distance in a rearward direction. That is, the first subframe 134a and the second subframe 134b may are horizontally symmetric with respect to the center of the second support plate 120. In addition, the third support plate 132 may be coupled to upper ends of the first subframe 134a and the second subframe 134b.

In addition, the subframe 134 may further include a third subframe 134c. The third subframe 134c may have a pillar shape that extends in the upward and downward direction. In addition, similarly to the first subframe 134a and the second subframe 134b, the third subframe 134c may be fixed to the upper surface of the second support plate 120.

In addition, the third subframe 134c may be disposed adjacent to the main frame 131. For example, the third subframe 134c may be spaced apart from the center of the second support plate 120 at a predetermined distance in a forward direction. That is, the third subframe 134c may be disposed in the front of the second support plate 120 by taking into consideration the center of gravity of the third support plate 132. In addition, the third support plate 132 may be coupled to an upper end of the third subframe 134c.

In addition, the body part 13 may further include a bracket part 135. The bracket part 135 may have a plate shape elongated in the upward and downward direction and thus may be coupled to the main frame 131. Specifically, the bracket part 135 may include the first bracket part 135*a* and the second bracket part 135*b*.

The first bracket part 135*a* may be coupled to the first main frame 131*a*, and the second bracket part 135*b* may be coupled to the second main frame 131*b*.

The first bracket part 135*a* and the second bracket part 135*b* may be disposed to face each other. That is, the first bracket part 135*a* and the second bracket part 135*b* may be respectively fixed to a surface of the first main frame 131*a* and a surface of the second main frame 131*b*, which face each other.

In addition, the first bracket part 135*a* and the second bracket part 135*b* may extend downward from the upper ends of the first main frame 131*a* and the second main frame 131*b*, respectively. In addition, a lower portion of the first bracket part 135*a* and a lower portion of the second bracket part 135*b* may penetrate the third support plate 132.

In addition, the body part 13 may further include the second substrate 133*b*. The second substrate 133*b* may be disposed on the first bracket part 135*a*. Specifically, the second substrate 133*b* may be disposed on the lower portion of the first bracket part 135*a*. The second substrate 133*b* may include, for example, a Micro Controller Unit (MCU) board. The MCU board may control overall driving of the moving robot 1. In addition, the second substrate 133*b* may include a memory, or the MCU board may include a memory that stores data capable of supporting a variety of functions of the moving robot 1.

In addition, the body part 13 may further include the third substrate 133*c*. The third substrate 133*c* may be disposed on the first bracket part 135*a*. Specifically, the third substrate 133*c* may be disposed above the second substrate 133*b*. The third substrate 133*c* may include, for example, a stereo board. The stereo board may process sensing data collected from various sensors and cameras to manage data used to recognize a position of the moving robot 1 and an obstacle.

In addition, the body part 13 may further include the fourth substrate 133*d*. The fourth substrate 133*d* may be disposed on the first bracket part 135*a*. Specifically, the fourth substrate 133*d* may be disposed above the third substrate 133*c*. The fourth substrate 133*d* may include, for example, a user interface board.

The user interface board may control operation of a constituent element in charge of inputting/outputting with respect to a user.

In addition, the body part 13 may further include the fifth substrate 133*e*. The fifth board 133*e* may be disposed on the second bracket part 135*b*. Specifically, the fifth substrate 133*e* may be disposed to face the second substrate 133*b* from an inner side of the second bracket part 135*b*. The fifth substrate 133*e* may include, for example, a power board. The power board may control power of the battery 117 to be supplied to each constituent element included in the moving robot 1.

In the present embodiment, it is described such that the body part 13 includes the five substrates 133*a*, 133*b*, 133*c*, 133*d*, and 133*e*. However, the number of the substrates 133 is not limited to the aforementioned numeric value and may be smaller or greater than the aforementioned numeric value. In addition, types of the substrates are merely exemplified and thus not limited to the aforementioned types of substrates.

In addition, the body part 13 may further include the front lidar 136. The front lidar 136 may be a laser lidar that is a sensor configured to irradiate a laser beam, collect rearwardly scattered lights from lights absorbed by aerosol or scattered, analyze the collected lights so as to recognize a position. The front lidar 136 may have the same configuration of the rear lidar 118. However, the front lidar 136 may be disposed at the front of the second support plate 120. That is, the front lidar 136 may be disposed to face forward of the moving robot 1. The front lidar 136 may be exposed to the outside through the first cut-open portion 331 formed in the second middle cover 33. In addition, the front lidar 136 may be placed on the height adjustment rib 122 formed in the second support plate 120.

In addition, the body part 13 may further include a stereo camera 137. Together with the RGBD sensor 321, the stereo camera 137 may serve to sense an obstacle existing in front of the moving robot 1. The stereo camera 137 may acquire a stereoscopic image using two cameras, and measure a distance between the moving robot 1 and an obstacle using the acquired stereoscopic image. For example, the stereo camera 137 may be disposed right above the front lidar 136. To this end, the stereo camera 137 may be fixed to one side of the third subframe 134*c*. In addition, the stereo camera 137 may photograph a forward area of the moving robot 1 through the stereo camera hole 323 formed in the first middle cover 32.

Meanwhile, the main body 10 may further include the head part 15. The head part 15 may be disposed above the body part 13. The head part 15 may be coupled to top cover 31 and may be configured to allow the top cover 31 to rotate.

In detail, the head part 15 may further include a fourth support plate 151. The fourth support plate 151 may be placed on an upper end of the main frame 131 and may be coupled to the main frame 131. The fourth support plate 151 may have a circular plate shape, and may include a weight reducing hole 151*a* to minimize a weight thereof.

In addition, the head part 15 may further include a rotating member 152. The rotating member 152 may be disposed above the fourth support plate 151 and configured to be rotatable by a predetermined angle. The rotating member 152 may have a ring shape. The rotating member 152 may be coupled to a rotation motor which will be described later. To this end, the rotating member 152 may include a motor coupler 152*a* that extends at a certain peripheral portion toward the center of the rotating member 152. The top cover 31 may be coupled to a periphery of the rotating member 152. Accordingly, the top cover 31 may be rotated by rotation of the rotating member 152.

In addition, the head part 15 may further include a rotation motor 153. The rotation motor 153 may provide a driving force to rotate the rotating member 152. The rotation motor 153 has a rotational shaft, and the rotational shaft may be coupled to the motor coupler 152*a*. Accordingly, the rotating member 152 may rotate in one direction or the other direction upon driving of the rotation motor 153. The rotation motor 153 may include, for example, a DC motor, but aspects of the present invention are not limited thereto and various motors such as a stepping motor and the like may be applied.

Figure 7:
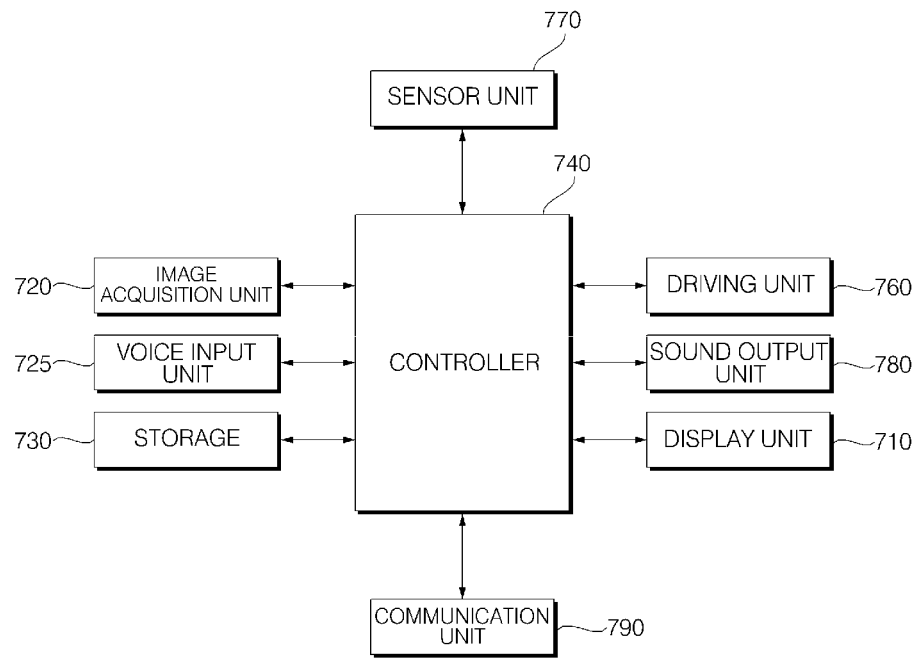
FIG. 7 is a block diagram illustrating a control relationship between major elements of a moving robot according to an embodiment of the present invention.

FIG. 7 is a block diagram illustrating a control relationship between major elements of a moving robot according to an embodiment of the present invention.

Referring to FIG. 7, a moving robot 1 according to an embodiment may include a voice input unit 725 configured to receive a voice input from a user through a microphone 314, a storage 730 configured to store a variety of data, a communication unit 790 configured to transmit and receive data with a different electronic data such as a server (not shown), and a controller 740 configured to control overall operations of the moving robot 1. These elements may be mounted on the aforementioned substrates 133.

The voice input unit 725 may include or be connected to a processor, which converts analog sound into digital data, and thus may convert a voice signal from a user into data to be recognized by the controller 740 or the server (not shown).

The controller 740 may control overall operations of the moving robot by controlling the voice input unit 725, the storage 730, the communication unit 790, etc. included in the moving robot 1.

The storage 730 records a variety of information necessary to control the moving robot 1 and may include a volatile or non-volatile record medium. The record medium stores data readable by a microprocessor, and may include a Hard Disk Drive (HDD), a Solid State Disk (SSD), a Silicon Disk Drive (SDD), a ROM, a RAM, a CD-ROM, a magnetic tape, a floppy disk, an optical data storage, etc.

In addition, the storage 730 may store a variety of data necessary for the moving robot 1 to provide a guide service.

In addition, the controller 740 may transmit an operation state of the moving robot 1, a user input, or the like through the communication unit 790.

The communication unit 790 may include at least one communication module so as to connect the moving robot 1 to the Internet or a predetermined network.

Meanwhile, data for voice recognition may be stored in the storage 730, and the controller 740 may process a voice signal, received from a user through the voice input unit 725, and perform a voice recognition procedure.

Meanwhile, the controller 740 may perform control such that the moving robot 1 performs a predetermined operation based on a voice recognition result.

For example, when a command included in a voice signal is a command for requesting predetermined information, such as flight departure information, tour guide information, etc., the controller 740 may perform control to display the predetermined information such as the light departure information, tourism information, etc. on a display unit 710.

In addition, when a guide request is received from a user, the controller 740 may perform control to escort the user to a guide destination selected by the user.

Meanwhile, the voice recognition procedure may be performed by a server, not by the moving robot 1 itself.

In this case, the controller 740 may control the communication unit 790 to transmit a voice signal from a user to the server, and may receive a recognition result of the voice signal from the server through the communication unit 790.

Alternatively, simple voice recognition such as wake-up call recognition may be performed by the moving robot 1, and sophisticated voice recognition such as natural language processing may be performed by the server.

Meanwhile, the moving robot 1 may include the display unit 710 configured to display predetermined information, and a sound output unit 780 configured to output predetermined information as a sound.

The display unit 710 may display information corresponding to a request from a user, a process result of the request from the user, an operation mode, an operation state, an error state, etc. as an image.

As described above with reference to FIGS. 1 to 6, the display unit 710 may include a head display 312 and a body display 21. The body display 21 may be configured to be relatively larger than the head display 312, and thus, it may be more preferable that information is displayed in large size of the body display 21.

Under control of the controller 740, the sound output unit 780 may output sound to provide an alarming sound, a notification message such as an operation mode, an operation state, an error state, etc., information corresponding to a request from a user, a process result of the request from the user, etc. The sound output unit 780 may convert an electric signal from the controller 740 into an audio signal, and output the audio signal. To this end, a speaker or the like may be provided.

Meanwhile, the moving robot 1 may include an image acquisition unit 720 capable of photographing an area in a predetermined range.

The image acquisition unit 720 may include a camera module to photograph surroundings and an external environment of the moving robot 1. Such a camera may be installed in plural at each position for photographing efficiency.

For example, as described above with reference to FIGS. 1 to 6, the image acquisition unit 720 may include a head camera unit 313 configured to recognize a human and an object, and a body camera unit 25 configured to identify and track a subject to guide. However, the number, arrangement, types, and photographing range of cameras provided in the image acquisition unit 720 are not necessarily limited thereto.

The image acquisition unit 720 may capture an image to recognize a user. Based on the image captured and acquired by the image acquisition unit 720, the controller 740 may determine an external situation or recognize the user (a subject to guide).

In addition, the controller 740 may perform control of the moving robot 1 to travel based on the image captured and acquired by the image acquisition unit 720.

Meanwhile, the image captured and acquired by the image acquisition unit 720 may be stored in the storage 730.

Meanwhile, the moving robot 1 may include a driving unit 760 to move, and the driving unit 760 may correspond to the driving unit 11 described above with reference to FIGS. 1 to 6. The driving unit 760 may move a main body 10 under control of the controller 740.

Meanwhile, the moving robot 1 may include a sensor unit 770 including sensors configured to sense a variety of data related to operations and states of the moving robot 1.

The sensor unit 770 may include an obstacle sensor configured to sense an obstacle, and the obstacle sensor may include an infrared sensor, an ultrasonic sensor, an RF sensor, an electromagnetic sensor, a Position Sensitive Device (PSD) sensor, etc. For example, the obstacle sensor may correspond to the ultrasonic sensor 333, the RGBD sensor 321, etc. described above with reference to FIGS. 1 to 6.

In addition, the sensor unit 770 may further include a cliff sensor 113 configured to sense presence of a cliff on a floor in a travel area.

In some embodiments, the sensor unit 770 may further include a sensor configured to sense volume of a sound acquired through the microphone 314, and accordingly, a volume of a voice spoken by a user and a volume of ambient noise may be sensed.

Alternatively, without including a separate sensor, the voice input unit 725 may determine volume of a user's speech and volume of ambient noise in a procedure of processing a signal acquired through the microphone 314.

In addition, the sensor unit 770 may include a Light Detection and Ranging (lidar) 136 and 118.

The lidar 136 and 118 may detect an object such as an obstacle and the like on the basis of Time of Flight (TOF) between a transmitted signal and a received signal by means of a laser beam or on the basis of a phase difference between a transmitted signal and a received signal.

In addition, the lidar 132a and 132b may detect a distance to an object, a speed relative to the object, and a position of the object.

The lidar 132a and 132b may be provided as part of the obstacle sensor. In addition, the lidar 132a and 132b may be provided as a sensor for writing a map.

Meanwhile, the obstacle sensor senses an object existing in a traveling (moving) direction of the moving robot, especially an obstacle, and transmits a sensing result to the controller 740. In this case, the controller 740 may control movement of the moving robot 1 according to a position of the sensed obstacle.

Meanwhile, the sensor unit 770 may further include an operation sensor configured to sense an operation of the moving robot 1 upon driving of the main body 10 and output operation information. For example, a gyro sensor, a wheel sensor, an acceleration sensor, etc. may be used as the operation sensor.

The gyro sensor senses a direction of rotation of the moving robot 1 moving according to an operation mode, and detects an angle of rotation. The gyro sensor may detect an angular velocity of the moving robot and output a voltage value proportional to the angular velocity. The controller 740 may calculate a direction of rotation and an angle of rotation using the voltage value output from the gyro sensor.

The wheel sensor may be connected to a left wheel and a right wheel to detect the number of rotations of the respective wheels. In this case, the wheel may be a rotary encoder. The rotary encoder detects and outputs the number of rotations of the left wheel and the right wheels.

The controller 740 may calculate a rotational speed of each of the left and right wheels using the number of rotations. In addition, the controller 740 may calculate an angle of rotation using a difference in the number of rotations between the left wheel and the right wheel.

The acceleration sensor senses a change in speed of the moving robot 1, e.g., a change in speed according to a start, a stop, a direction change, collision with an object, etc. The acceleration sensor may be attached to a position adjacent to a main wheel or a secondary wheel to detect the slipping or idling of the wheel.

In addition, the acceleration sensor may be embedded in the controller 740 to sense a change in speed of the moving robot 1. itself that appears in a cleaning mode or in a travel mode. That is, the acceleration sensor detects impulse according to a change in speed and outputs a voltage value corresponding thereto. Thus, the acceleration sensor may perform the function of an electronic bumper.

The controller 740 may calculate a change in position of the moving robot 1 based on operation information output from the operation sensor. Such a position is a relative position corresponding to an absolute position based on image information. The moving robot may improve performance of position recognition using image information and obstacle information through recognition of such a relative position.

As described with reference to FIGS. 1 to 7, the moving robot 1 according to an embodiment of the present invention may include the voice input unit 725 configured to receive a voice input from a user, the first display 312 enabling a touch input, the second display 21 larger than the first display 312, and the controller 740 configured to control overall operations of the moving robot 1.

In order to make it easier to apply a touch input, the first display 312 may be disposed above the second display 21.

Meanwhile, the controller 740 may provide predetermined information and service by variously combining the two displays 312 and 21 provided in the moving robot.

The controller 740 may perform control such that a predetermined screen is displayed on the first display 312 and/or the second display 21 in response to a voice input received through the voice input unit 725 or a touch input received through the first display 312.

In this case, based on a type and an amount of information included in the predetermined screen to display, the controller 740 may perform control such that the predetermined screen is displayed on at least one of the first display 312 or the second display 21.

The controller 740 may perform control such that information is displayed on the display 312 or 21 suitable for a purpose, such as an amount of information to provide, whether or not manipulation is made, etc.

For example, while the moving robot 1 is idle, the controller 740 may perform control such that a standby screen is displayed on the second display 21 larger than the first display 312.

The standby screen may include at least one of guide information, notification, or a predetermined advertisement that is common in a public place where the moving robot 1 is deployed.

In addition, the standby screen may sequentially include guide screens for preset destinations and advertising screens. That is, while the moving robot 1 is in standby, the controller 740 may perform control to sequentially display the guide screens guiding to the preset destinations and the advertising screens.

In addition, the standby screen may be configured differently depending on a place where the moving robot 1 is deployed.

Figure 8:
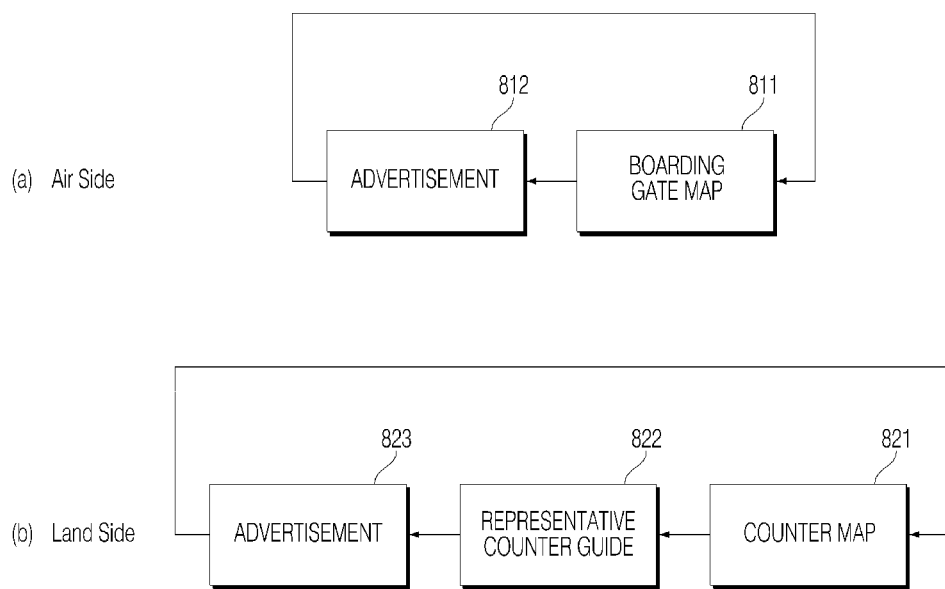
FIG. 8 is a diagram for explanation of a standby screen according to an embodiment of the present invention.

FIG. 8 is a diagram for explanation of a standby screen according to an embodiment of the present invention, which shows an example in which the moving robot 1 provides a guide service at an airport.

Meanwhile, the moving robot may display different standby screens according to characteristics of a place where the moving robot 1 is deployed at an airport.

For example, if the airport is classified into an air side, where duty free shops are located after immigration counters, and a land side, which corresponds other areas before immigration counters, a standby screen displayed by a moving robot 1 deployed in the air side and a standby screen displayed by a moving robot 1 deployed in the land side may be different.

Referring to (a) of FIG. 8, a boarding gate map screen 811 guiding locations of boarding gates, and an advertising screen 812 including one or more advertising images may be sequentially displayed on the second display 21 of a moving robot 1 deployed in the air side.

Referring to (b) of FIG. 8, a counter map screen 821 for guiding locations of counters in the land side, a representative counter guide screen 822 for guiding locations of counters of representative airlines, and an advertising screen 823 including one or more advertising images may be sequentially displayed on the second display 21 of a moving robot deployed in the land side.

Meanwhile, the advertising screens 812 and 823 may be provided on the basis of contents and a time agreed in a contract.

In addition, the representative counter guide screen 822 may be provided with a priority lower than that of the counter map screen 821. In some cases, the representative counter guide screen 822 and the advertising screen 823 may be sequentially displayed on the second display 21 of the moving robot 1 deployed in the land side.

Meanwhile, while the moving robot 1 is idle, the controller 740 may perform control such that an image of a facial expression corresponding to the standby state is displayed on the first display 312.

The moving robot 1 according to the present invention may receive a user's touch input through the first display 312 and receive the user's voice input through the voice input unit 725.

In addition, the first display 312 enabling a touch input may display a screen for requiring a user to manipulate, and the second display 21 of a large size may display a screen necessary to be enlarged, such as a map screen, when a great deal of information is given.

Thus, the moving robot 1 according to the present invention may provide a user with a variety of services by combining a touch input, a voice input, and the two displays 312 and 21 having different sizes and functions.

Figure 9:
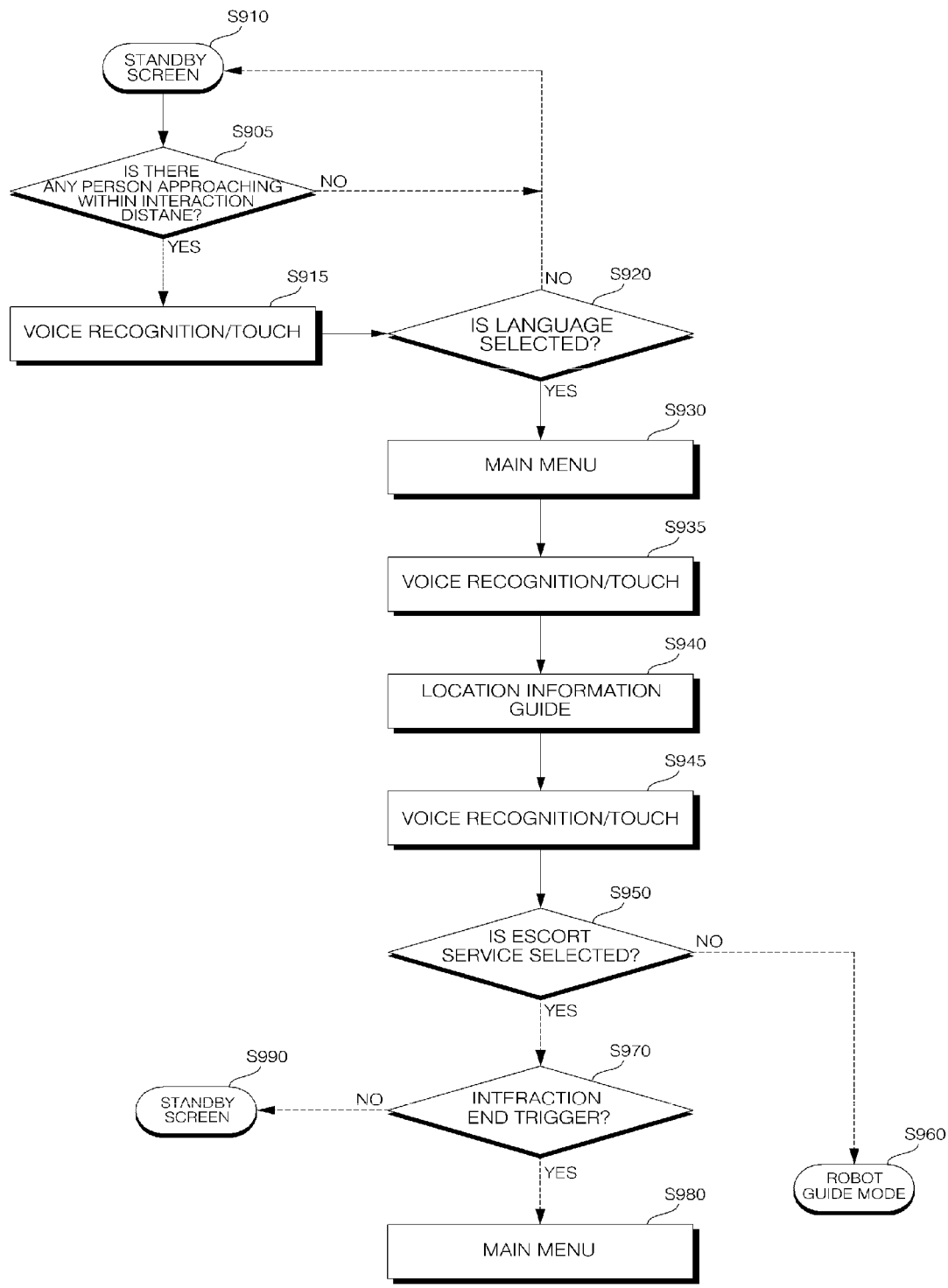
FIG. 9 is a flowchart of an operation method of a moving robot according to an embodiment of the present invention.

FIG. 9 is a flowchart of an operation method of a moving robot according to an embodiment of the present invention, which shows a procedure in which a moving robot 1 enters from a standby state into a robot guide mode of guiding to a predetermined destination by moving together.

Referring to FIG. 9, while sensing approaching of a person in a standby state (S905), a moving robot 1 may display a standby screen on a second display 21 (S910).

Sensing approaching of a person may be performed by a sensor unit 770 that includes an obstacle sensor, such as an ultrasonic sensor 333 and an RGBD sensor 321, a lidar 132*a* and 132*b*, etc.

In addition, approaching of a person within a predetermined distance may be determined based on an image acquired by the image acquisition unit 720 including a head camera part 313 and a body camera 25.

In addition, the controller 740 may determine presence of a person approaching the moving robot 1, a distance between the person and the moving robot, etc. by combining data acquired by the sensor unit 770 and the image acquisition unit 720.

The controller 740 may determine whether any person approaches within a preset interaction distance range (S905). The interaction distance range may be set on the basis of a distance within which the moving robot 1 is capable of receiving a touch input or a voice input from a service user.

Meanwhile, if a user is sensed within the preset interaction distance range (S905), the controller 740 may perform control to display a main screen including a plurality of menu items on the first display 312 (S930).

That is, if no person exists within a predetermined distance, the controller 740 may perform control to display a standby screen on the second display 21, and, if a person exists within the predetermined distance, the controller 740 may perform control to display a main screen including a plurality of menu items on the first display 312.

In addition, the controller 740 may perform control to display predetermined information on the first display 312 or the second display 21 based on a distance to the user.

According to the present invention, it is possible to switch a screen between the displays 312 and 21 depending on an amount of information, and information items grouped by connected context may be displayed separately on the displays 312 and 21.

The user may search for a place in an airport through the first display 312 located within a hand reach distance from the moving robot 1. The moving robot 1 may provide a search result in association with the second display 21 of a large size, according to amount of information contained in the search result.

According to the present invention, a display suitable for an interaction distance between the moving robot 1 and a user may be selected and used.

For example, if the moving robot 1 and a user are located at a long distance from each other, predetermined information may be displayed on the second display 21 of a larger size, and, if the moving robot 1 and the user are at a short distance from each other, predetermined information may be displayed on the first display 312.

In addition, if the user makes an attempt of interaction in a short distance to the moving robot 1, the user may be enabled to manipulate the moving robot 1 through touch and voice recognition and simple information may be displayed on the first display 312.

In addition, if the user makes an attempt of interaction in a long distance to the moving robot 1, the user may be enabled to manipulate the moving robot 1 through gesture and voice recognition and detailed information may be provided using the second display 21 which is configured to be large.

Meanwhile, people from all around the world may visit public places such as airports and thus a diversity of languages are used. in such places.

Accordingly, prior to displaying the main screen including the plurality of main menu items (S930), a screen for guiding a user to select a language may be displayed and a touch input or a voice input from the user may be recognized (S915), and then, if the language is selected (S920), the main screen including the plurality of main menu items may be displayed (S930).

Meanwhile, the controller 740 may perform control such that a screen allowed to be manipulated by the user's touch is displayed on the first display 312 whist a detail screen including details relating to the screen displayed on the first display 312 or a screen for triggering manipulation through the first display 312 is displayed on the second display 21.

For example, the controller 740 may perform control such that a main screen enabling selection of a predetermined item with a touch input is displayed on the first display and a screen for triggering manipulation through the main screen displayed on the first display is displayed on the second display 21.

Meanwhile, the controller 740 may recognize and process a user's voice input received through the voice input unit 725.

In addition, the controller 740 may display voice input guide information for the user in a predetermined area of the main screen.

Meanwhile, the main screen may include categories of guide available destinations classified by a predetermined standard, and the main screen may vary depending on a place where the moving robot 1 is deployed.

For example, a main screen displayed by a moving robot deployed in the air side and a main screen displayed by a moving robot deployed in the land side may include different menu items.

In addition, the moving robot deployed in the air side and the moving robot deployed in the land side may have different guide available destinations, and different categories of the guide available destinations classified by a predetermined standard.

Then, if the user inputs a predetermined keyword using a voice input or a touch input (S935), the controller 740 may provide a screen for guiding location information of a destination corresponding to the predetermined keyword (S940).

The screen for guiding location information of the destination may be provided through at least one of the first display 312 or the second display 21.

For example, a screen for guiding the location information of the destination may be displayed on the first display 312 or the second display 21.

Meanwhile, if a destination is input using a voice input or a touch input, a destination list, a position on a map, the current location, etc. may be displayed on the first display 312, and an entire airport map, a path, a distance, a required time to arrive, etc. may be displayed on the second display 21.

In addition, if a destination is input by inserting a ticket, brief information may be displayed on the first display 312 and a large image and detailed information may be displayed on the second display 21.

In addition, if a guide destination is received using a voice input or a touch input, the controller 740 may perform control such that a detail screen about the guide destination is displayed on the second display 21, whilst a menu item for a guide service (an escort service) of guiding to the destination by moving together and a guide message for guiding checking of the destination displayed on the second display 21 are displayed on the first display 312.

That is, the first display 312 may display a screen including a menu item enabling an escort service to be requested by a touch input and brief information, and the second display 21 may display a map screen including a guide destination and a detail screen including detailed information that includes a name, a location, a distance, etc. of the guide destination.

Meanwhile, the controller 740 may perform control to perform an operation corresponding to a user's voice input or touch input that is received (S945) while the screen for guiding location information of the destination is displayed.

For example, if a user requests an escort service (S950), the controller 740 may perform control to enter into a robot guide mode in which the moving robot 1 guides the user to a guide destination while moving together (S960).

In addition, if no input has been received for a predetermined period of time (S970), the controller 740 may perform control to display the standby screen again on the second display 21 (S990).

In addition, if the user checks and closes the screen for guiding the location information of the destination, the controller 740 may perform control display the main screen including the main menu screens on the first display 312 so that the user is allowed to select another menu item (S980).

Figure 10:
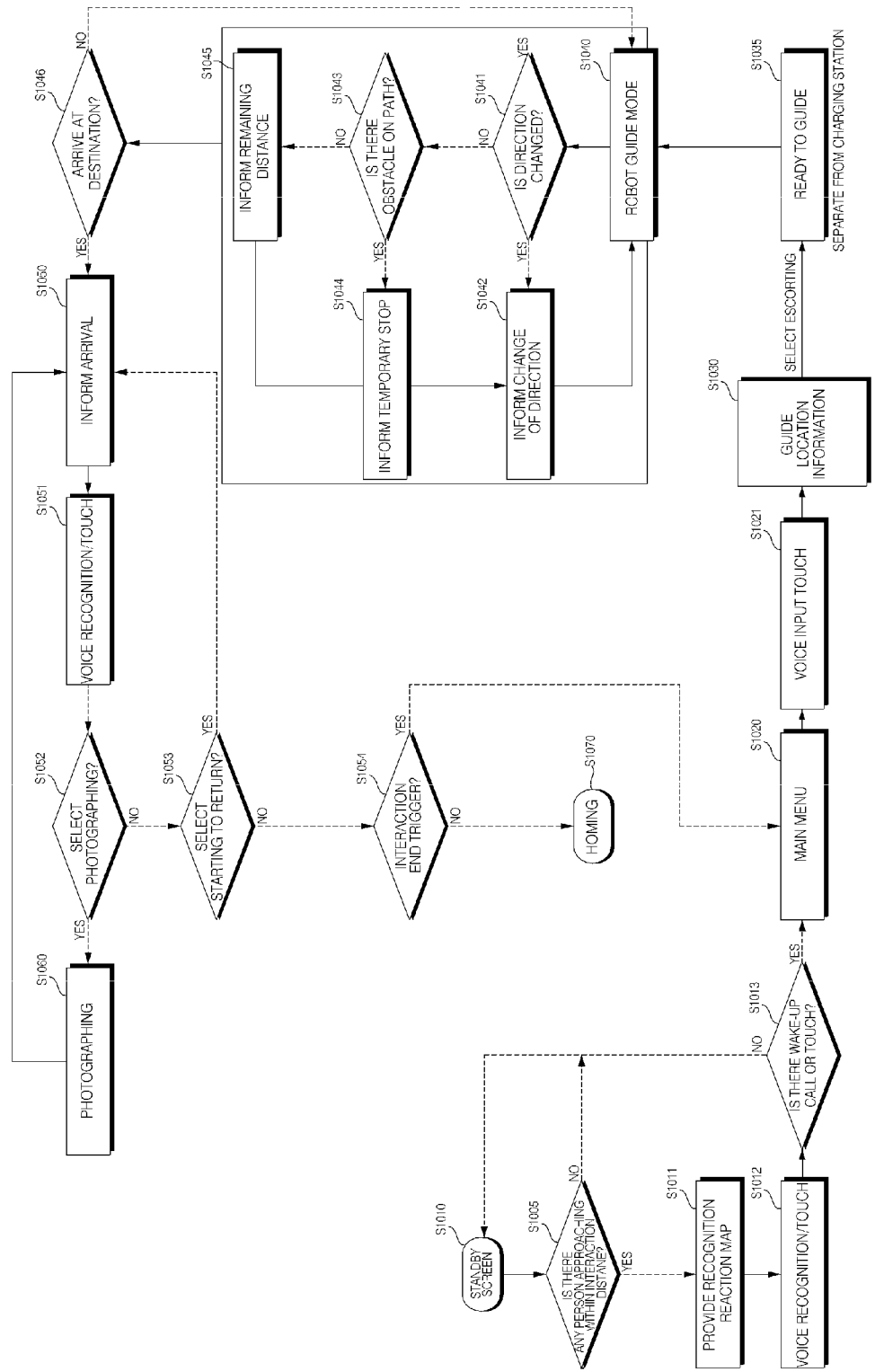
FIG. 10 is a flowchart of an operation method of a moving robot according to an embodiment of the present invention.

FIG. 10 is a flowchart of an operation method of a moving robot according to an embodiment of the present invention.

Referring to FIG. 10, a moving robot 1 may sense approaching of a person through a sensor unit 770 and/or the image acquisition unit 720 in a standby state (S1005), and display a standby screen on a second display 21 (S1010).

Based on data acquired by the sensor unit 770 and/or the image acquisition unit 720, the controller 740 may determine whether any person approaches within a preset interaction distance range (S1005).

When a user is sensed within the preset interaction distance range (S1005), the controller 740 may perform control that a screen including recognition reaction and a map on a first display screen 312 and/or a second display 21 (S1011).

The recognition reaction may include a greeting, which implies that the user has been recognized, and graphic information, and the map may include an area including at least the current location on the entire map.

In addition, the screen including the recognition reaction and the map may include a screen for guiding the user to select a language.

Meanwhile, the moving robot 1 may recognize a touch input or voice input of the user (S1012), and, if a voice input including a wake-up call or a touch input on the first display 312 is received (S1013), the moving robot 1 may display a main screen including a plurality of main menu items on the first display 312 (S1020).

Accordingly, if no person exists within a predetermined distance, the controller 740 may perform control to display a standby screen on the second display 21, and, if any person exists within the predetermined distance, the controller 740 may perform control to display a main screen including a plurality of main menu items on the first display 312.

Then, if the user inputs a predetermined keyword through the voice input or the touch input (S1021), the controller 740 may provide a screen for guiding location information of a destination corresponding to the keyword (S1030).

The screen for guiding the location information of the destination may be provided through at least one of the first display 312 or the second display 21.

For example, if a guide destination input is received as a voice input or a touch input, the controller 740 may perform control such that a detail screen regarding the guide destination is displayed on the second display 21 whilst a menu item for requesting a guide service (an escort service) of guiding to the received guide destination by moving together, and a guide message for guiding checking of the destination displayed on the second display 21 are displayed on the first display 312.

That is, the first display 312 may display a screen including a menu item for requesting a guide service through a touch input and brief information, and the second display 21 may display a map screen including a guide destination and a detail screen including detailed information which includes the guide destination's name, location, distance, etc.

Meanwhile, if a user requests for an escort service, the controller 740 may perform control such that the moving robot 1 enters into a robot guide mode of guiding the user to the guide destination while moving (S1040).

If the moving robot 1 is currently coupled to a charging station, the moving robot 1 may be separated from the charging station to be prepared for guide (S1035).

In some implementations, in the guide preparation step (S1035), the first display 312 may be directed toward a user and the second display 21 may move facing in a direction to move.

In some implementations, when the moving robot 1 is separated to enter into a robot guide mode (S1040), the head may rotate so that the first display 312 is directed in a moving direction, and the second display 21 may be directed rearward so that a user is allowed to see the second display 21 even when positioned behind the moving robot 1.

In the robot guide mode state (S1040), a variety of guide information may be displayed on the displays 21 and 312 so that the user is able to safely follow the moving robot 1 while the moving robot 1 moves to a guide destination.

For example, when a moving direction is changed (S1041), a screen for guiding the change of the direction may be displayed on the displays 21 and 312 (S1042).

In addition, when the moving robot 1 temporarily stops in response to sensing of an obstacle while moving (S1043), a screen for guiding the temporary stopping may be displayed on the displays 21 and 312 (S1044).

In addition, guide information such as a remaining distance to a guide destination and a remaining time to arrive at the guide destination may be displayed on the displays 21 and 312 while the moving robot moves (S1045).

Meanwhile, as described above with reference to FIGS. 1 to 7, the first display 312 may be disposed in the rotatable head. More specifically, the first display 312 may be disposed on one side of the top cover 31.

Meanwhile, when the moving robot 1 moves, the controller 740 may rotate the head.

In addition, when the moving robot 1 stops, the controller 740 may rotate the head to align the first display 312 and the second display 21.

Accordingly, while the moving robot 1 travels or is stopped, the first display 312 and the second display 21 may be directed in different directions.

For example, while the moving robot 1 is in a standby state, the first display 312 and the second display 21 may be directed in the same direction, as shown in FIG. 5.

In addition, while the moving robot 1 travels, the first display 312 and the second display 21 may be directed in directions opposite to each other, as shown in FIG. 1.

In this case, it is more preferable that a variety of guide information displayed in the robot guide mode state (S1040) is displayed on the second display 21.

Meanwhile, when the moving robot 1 arrives at the guide destination (S1046), the moving robot 1 may inform the arrival at the destination (S1050).

In this case, according to a voice input or a touch input by the user (S1051), photographing, service evaluation, etc. may be performed.

For example, when a user selects photographing (S1052), a photo of the user may be taken using a camera provided in the image acquisition unit 720 (S1060).

The controller 740 may perform control to display a photography guide screen on the first display 312 upon arrival at a predetermined guide destination and to display a camera view screen of the camera on the second display 21 when a user selects photographing.

In addition, after the photographing, the controller 740 may display the photo on the first display 312 or the second display 21, and control the communication unit 790 to transmit the photo to an email address according to selection of the user.

Meanwhile, when the user selects finishing a guide service or returning (S1053) or when no additional input is applied for a predetermined period of time (S1054), the moving robot 1 may return to the home or a preset place (S1070)

FIGS. 11 to 36 are diagrams for explanation of an operation method of a moving robot according to an embodiment of the present invention.

Figure 11:
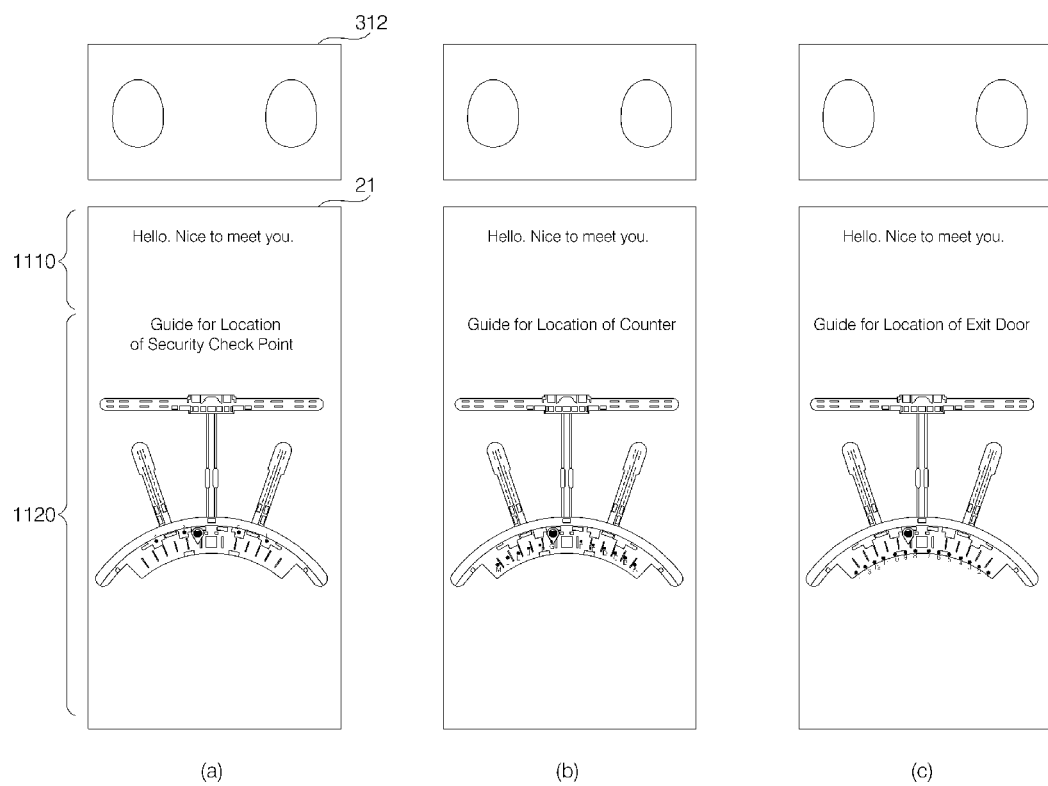
FIGS. 11 to 36 are diagrams for explanation of an operation method of a moving robot according to an embodiment of the present invention.
Figure 12:
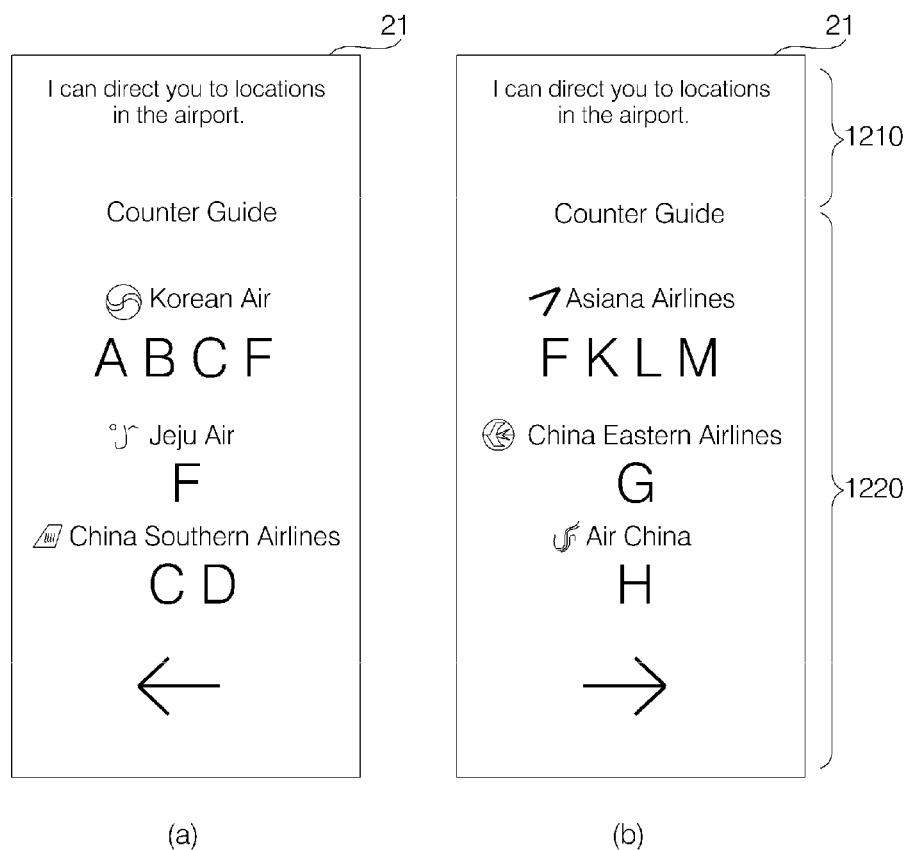
Figure 13:
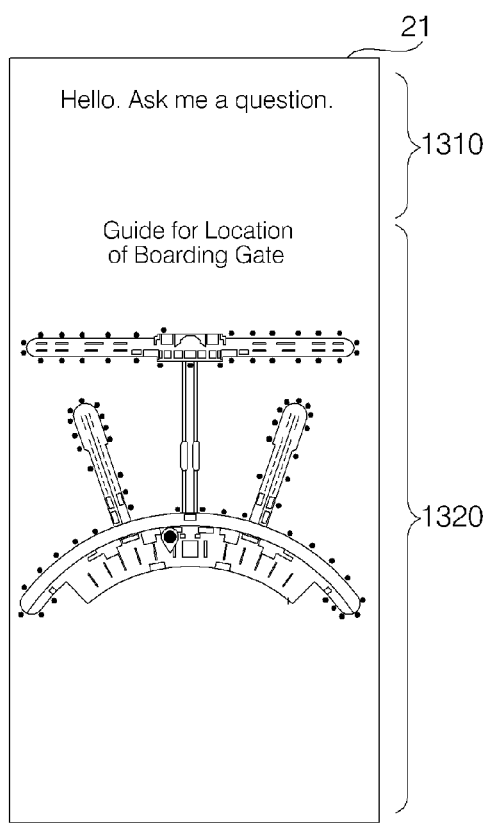

FIGS. 11 to 13 shows exemplary standby screens.

Referring to (a) to (c) of FIG. 11, a moving robot 1 in a standby state may display, on a first display 312, an image representing a face expression corresponding to the standby state.

Referring to (a) to (c) of FIG. 11, the moving robot 1 in the standby state may display, in a usage guide area 1110 of a second display 21, a greeting such as "Hello. Nice to meet you" and description about a guide function, sequentially.

The greeting and the description may be provided in multiple languages. For example, "즐거운 여행되세요 " and "Have a nice trip" may be displayed alternately.

In addition, as for the greeting, a variety of expressions such as "행복한 하루되세요..", "Have a great day", "편안한 여행 되세요..", "Have a comfortable trip", "안녕하세요.. 제이름은 에어스타입니다..", and "Hello, my name is AirStar." may be used.

In addition, as for the description about the guide function, "저는 공항 위치 안내를 도와드릴수있어요..", "I can direct you to locations in the airport.", "저에게 말을 걸어보세요..", "Hello. Ask me a question.", etc. may be used.

In addition, the greeting and the description may be provided in Chinese and Japanese as well as Korean and English.

Meanwhile, the moving robot 1 in the standby state may display a screen for guiding preset destinations in an information area 1120 of the second display 21.

For example, the guide screen displayed in the information area (1120) may include a map that includes security checkpoints (see (a) in FIG. 11), counters (see (b) in FIG. 11), and exit doors (see (c) of FIG. 11).

In addition, maps including location information of the security checkpoints (see (a) in FIG. 11), the counters (see (b) in FIG. 11), and the exit doors (see (c) of FIG. 11) may be sequentially displayed in the information area 1120.

Meanwhile, the standby screen displayed by the moving robot 1 may vary according to a characteristic of a place where the moving robot 1 is deployed within an airport.

For example, screens including location information of security checkpoints (see (a) in FIG. 11), counters (see (b) in FIG. 11), and exit doors (see (c) of FIG. 11) within the land side may be sequentially displayed on the second display 21 of the moving robot 2 deployed in the land side.

In addition, as shown in FIG. 12, a moving robot 1 may display a guide screen for representative counters of representative airlines on a second display 21.

Referring to (a) and (b) of FIG. 12, greeting and the like may be displayed in a usage guide area 1210 of the second display 21, and a guide screen for the currently available representative counters may be displayed in an information area 1220.

In addition, information displayed in the information area 1220 may be switched at every predetermined time (e.g., 30 seconds).

In addition, after displaying the guide screens exemplified in FIGS. 11 and 12, the moving robot 1 deployed in the land side may display an advertising screen including a predetermined advertisement image. In addition, the advertising screen may be provided on the basis of contents and a time agreed in a contract.

Meanwhile, referring to FIG. 13, a screen for boarding gate locations may be displayed on a second display 21 of a moving robot 1 deployed in the air side.

A greeting and the like may be displayed in a usage guide area 1310 of the second display 21, and an entire boarding gate map screen may be displayed in an information area 1320.

In addition, the moving robot 1 deployed in the air side may sequentially display the entire boarding gate map screen and an advertising screen.

Meanwhile, when information displayed on a standby screen is switched, the controller 740 may rotate a head so that the first display 312 is directed toward a nearest person.

Meanwhile, based on data acquired by a sensor unit 770 and/or an image acquisition unit 720, the controller 740 may determine whether any person approaches within a preset interaction distance range.

If a user is sensed within the preset interaction distance range, the controller 740 may perform control such that a screen for guiding the user to select a language is displayed on the first display 312.

Figure 14:
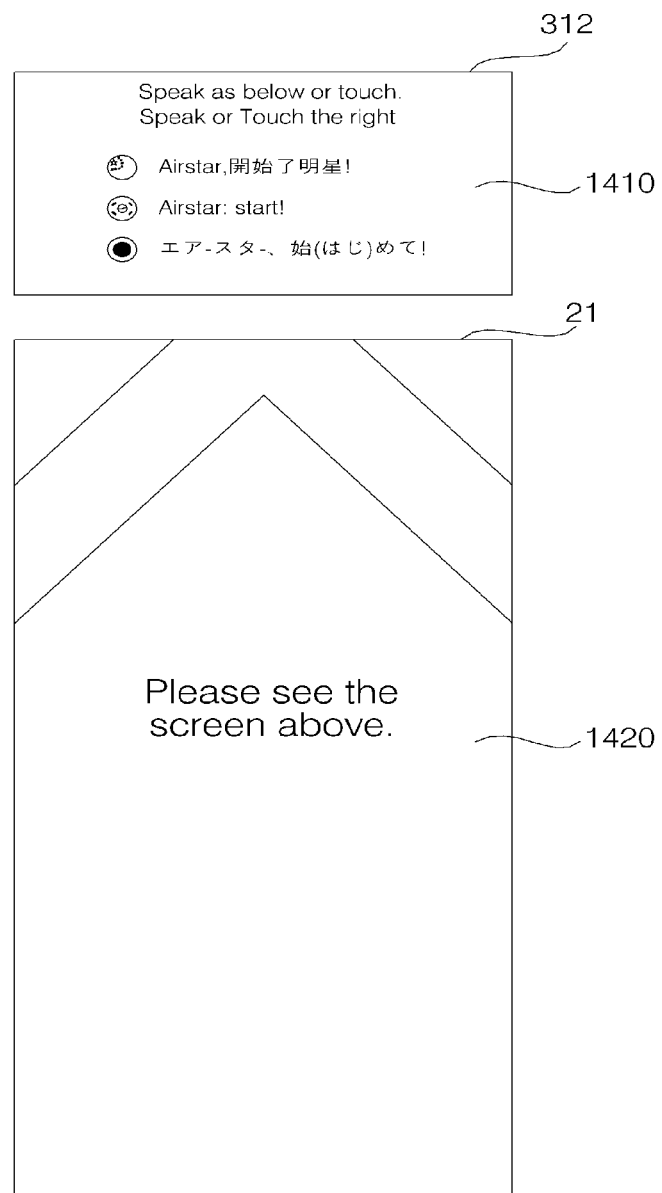

FIG. 14 is an example of a language selection screen.

Referring to FIG. 14, a Korean text such as "에어스타, 시작해" and other texts having the same meaning but written in different languages may be displayed on the first display 312.

In addition, a screen 142 for triggering manipulation of the first display 312 may be displayed on the second display 21.

If a user selects a text corresponding to a language used by the user, the controller 740 may provide a service in the desired language of the selected text.

Alternatively, if a user speaks a voice input such as "Airstar, start", the controller 740 may recognize a language spoken by the user and provide a service in the recognized language.

Meanwhile, after selecting the language, the moving robot 1 may display a main screen including a plurality of main menu items on the first display 312.

Figure 15:
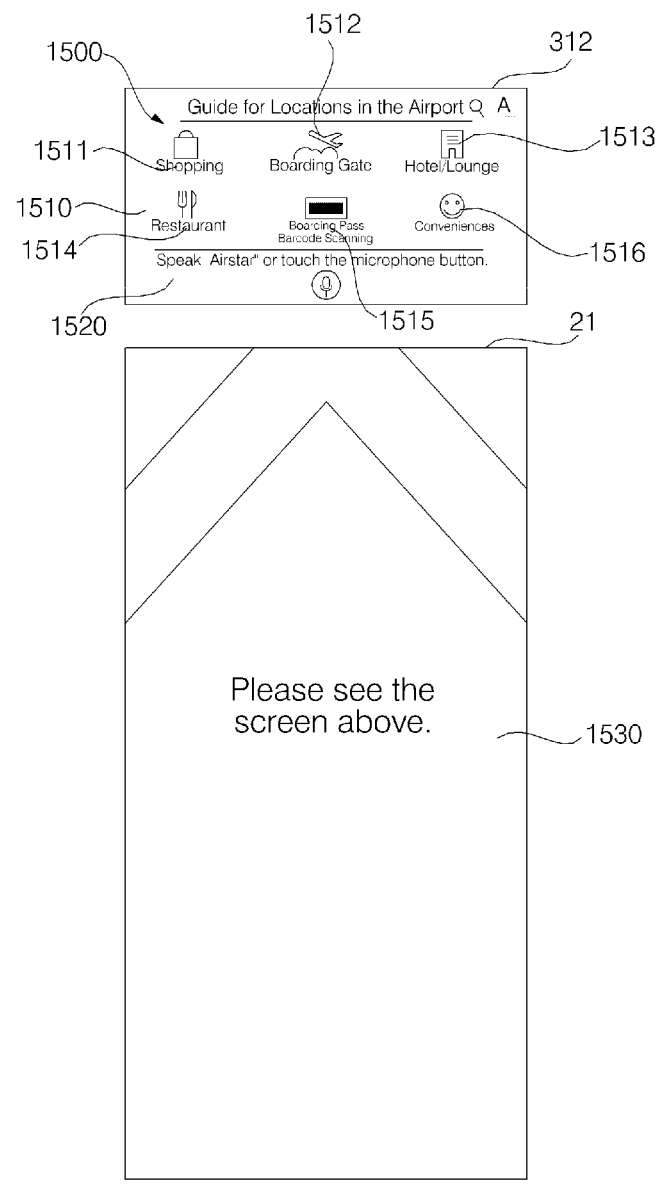
Figure 16:
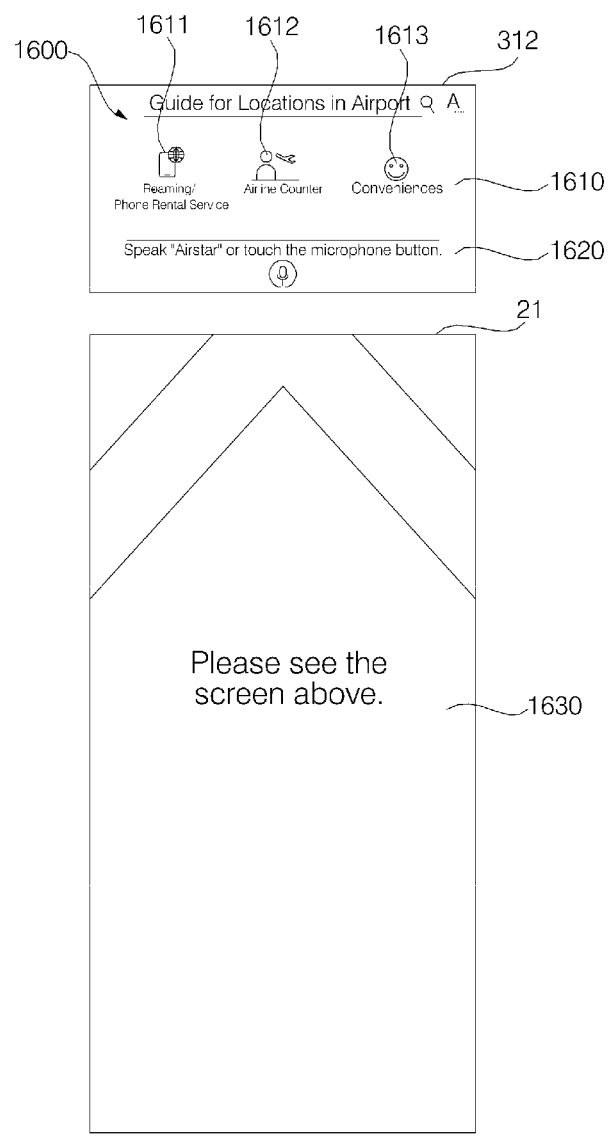

FIGS. 15 and 16 are diagrams exemplifying main screens: FIG. 15 shows an example of a main screen displayed by a moving robot deployed in the air side, and FIG. 16 shows an example of a main screen displayed by a moving robot deployed in the land side.

Referring to FIG. 15, a main screen 1500 displayed on a first display 312 of a moving robot deployed in the air side may include a main menu area 1510 and a voice recognition area 1520.

The main menu area 1510 may include main menu items of categories into which destinations are classified by a predetermined standard.

For example, the main menu items may include Shopping 1511, Boarding Gate 1512, Hotel/Lounge 1513, Restaurant 1514, Boarding Pass Barcode Scanning 1515, and Conveniences 1516.

After selecting one of Shopping 1511, Boarding Gate 1512, Hotel/Lounge 1513, Restaurant 1514, Boarding Pass Barcode Scanning 1515, and Conveniences 1516 through a voice input or a touch input, the user may search for a destination included in the selected category or may be provided with a corresponding service.

A voice recognition microphone button and a wake-up call guide may be displayed in the voice recognition area 1520. For example, if a wake-up call is set as "Airstar", a wake-up call guide instructing to speak "Airstar" or touch the microphone button may be displayed.

The controller 740 may perform control to enter a voice recognition process when the user touches the microphone button in the voice recognition area 1520 or speaks a wake-up call. The voice recognition process will be described later with reference to FIGS. 24 to 27.

Meanwhile, a screen 1530 for triggering manipulation of the first display 312 may be displayed on the second display 21.

Referring to FIG. 16, a main screen 1600 displayed in a first display 312 of a moving robot deployed in the land side may include a main menu area 1610 and a voice recognition area 1620.

The main menu area 1610 may include main menu items of categories into which destinations are classified by a predetermined standard.

For example, the main menu items may include Roaming 1611, Airline Counter 1612, and Conveniences 1613.

A voice recognition microphone button and a wake-up call guide may be displayed in the voice recognition area 1620.

Meanwhile, a screen 1630 for triggering manipulation of the first display 312 may be displayed on a second display 21.

Figure 17:
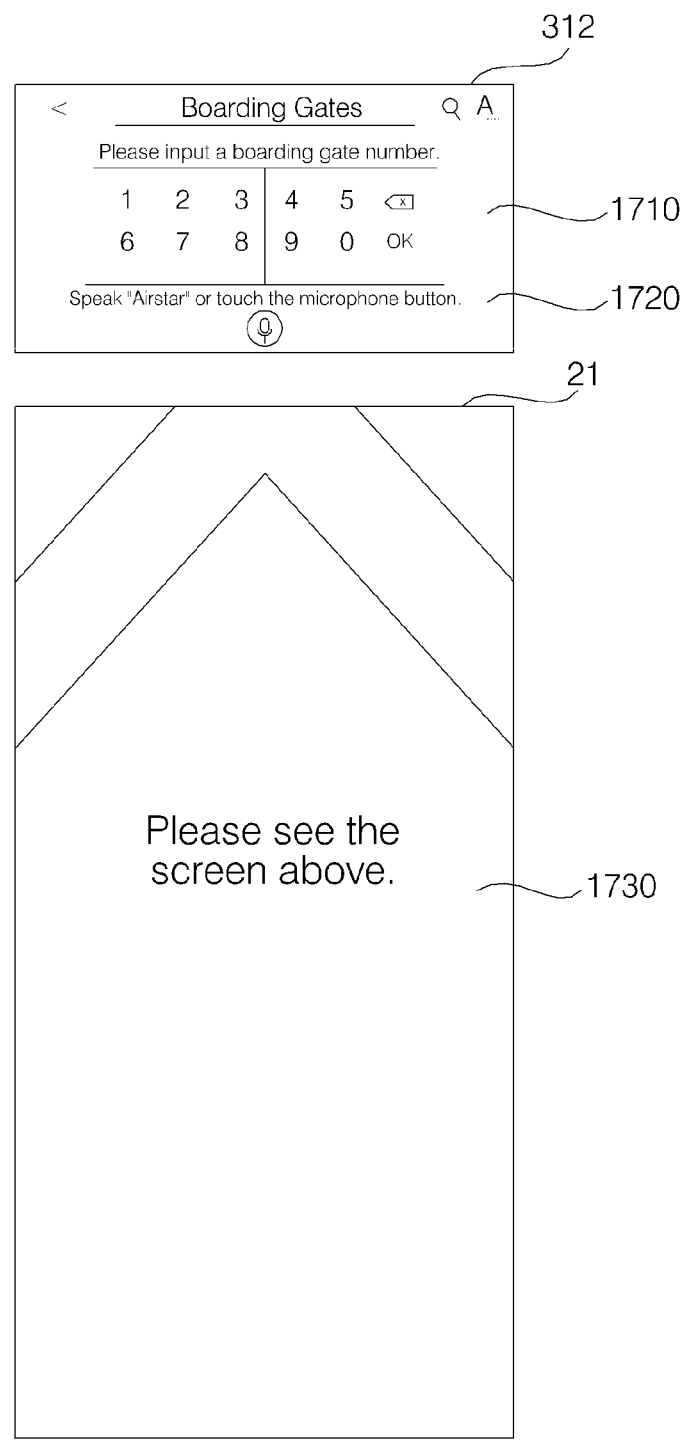

FIG. 17 shows an example of a screen displayed when Boarding Gate 1512 is selected from among main menu items.

Referring to FIG. 17, a boarding gate input screen where a user is allowed to input a boarding gate number on his/her own may include an input area 1710 and a voice recognition area 1720.

The input area 1710 may include a text guide such as "Input Boarding Gate Number", "Please Try Again", etc.

In addition, the input area 1710 may include an input button such as a number panel, an enter key, etc.

In addition, the input area 1710 may include an input window, where an input number is displayed, and a delete key.

Meanwhile, the user may input a boarding gate number through a voice in accordance with a guide displayed in the voice recognition area 1720.

Meanwhile, a screen 1730 for triggering manipulation of the first display 312 may be displayed on the second display 21.

Figure 18:
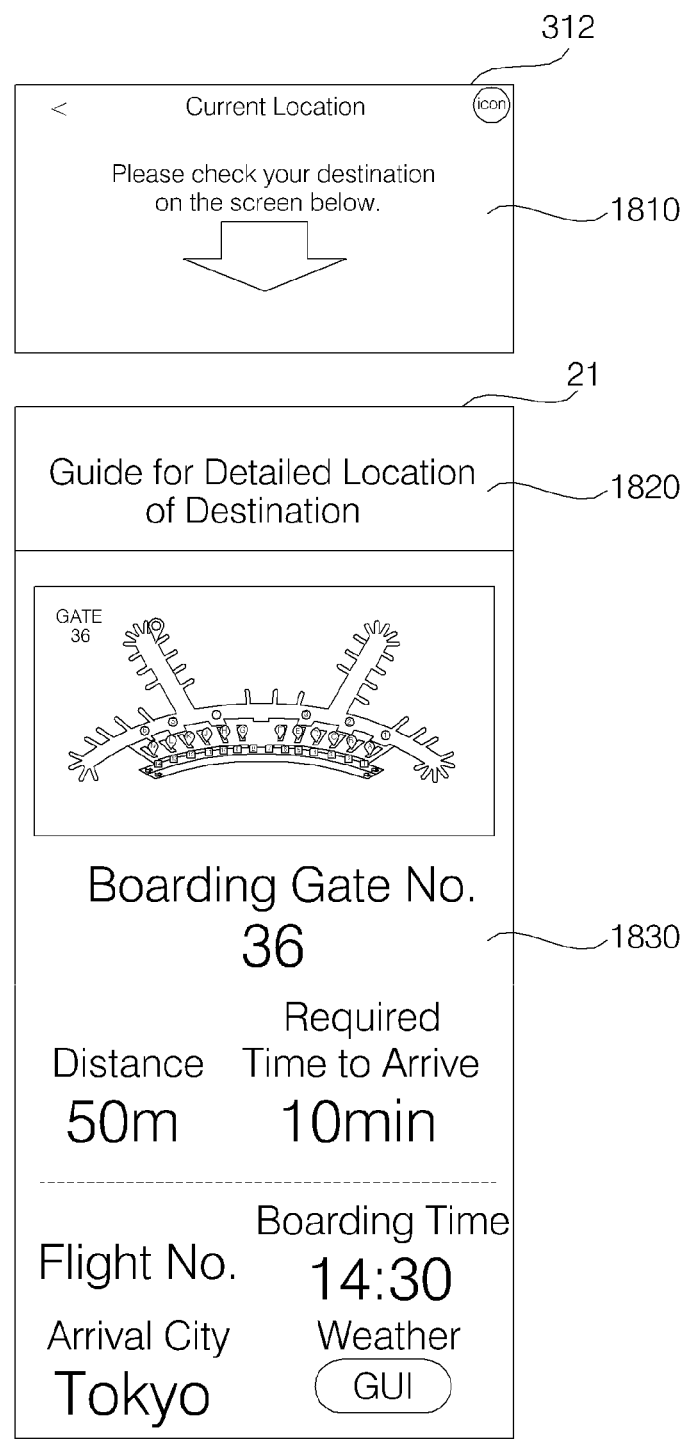

Referring to FIG. 18, the controller 740 may display, based on a boarding gate number input by a user, a screen for guiding a detailed location of a boarding gate corresponding to a destination on a second display 21.

Referring to FIG. 18, the screen for guiding the detailed location of the destination may include a user guide area 1820 providing a title and a manipulation trigger guide, and an information area 1830 displaying detailed information.

The information area 1830 may display a map where location information of a boarding gate corresponding to a destination is displayed, a number of the boarding gate, information on a path and a distance to the destination from the current location, an expected required time to arrive, etc.

Meanwhile, the information area 1830 may further display information about a flight to depart at the earliest time from the current time among flights scheduled to board at the corresponding boarding gate. For example, the information area 1830 may further include destination weather, local time, flight hours, etc.

Alternatively, in the case of a ticket such as a boarding pass is scanned, information about the flight may be further displayed based on the ticket scan result. For example, the information area 1830 may further include destination weather, local time, flight hours, etc.

Meanwhile, the controller 740 may display, on the first display 312, a screen 1810 for guiding checking of information displayed on the second display 21.

Figure 19:
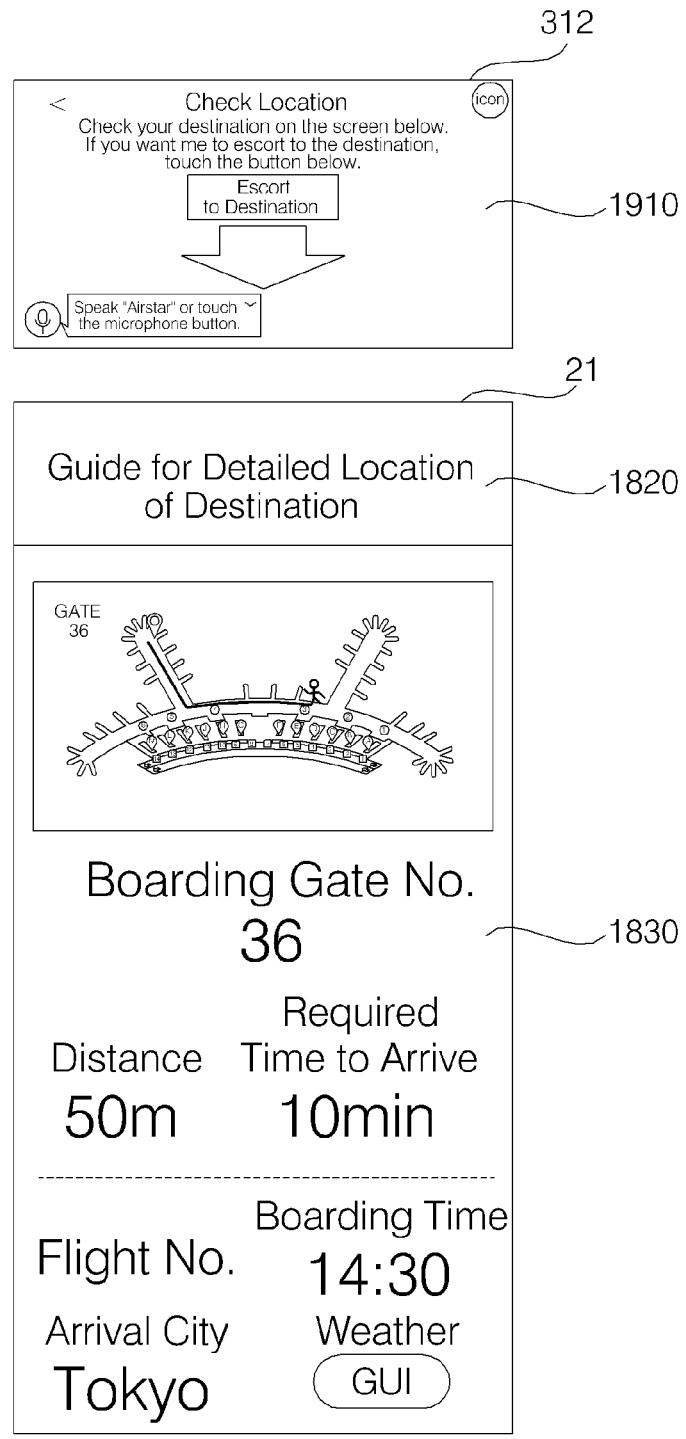

Referring to FIG. 19, the controller 740 may perform control such that, after a preset period of time passes, a screen displayed on the first display 312 is switched to a screen 1910 including a menu item for requesting a guide service of guiding to an input destination by moving together, and a guide message for guiding checking of a destination displayed on the second display.

If the user requests the guide service, the controller 740 may perform control to enter into the robot guide mode to thereby guide the user to the guide destination.

Figure 20:
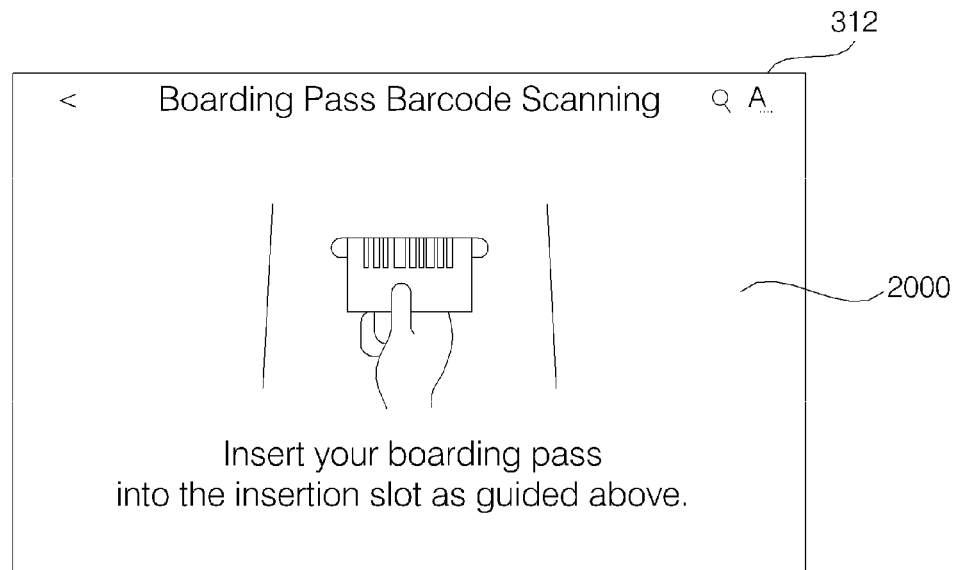

FIG. 20 shows an example of a screen displayed when Boarding Pass Barcode Scanning 1515 is selected from among main menu items.

Referring to FIG. 20, in response to selection of Boarding Pass Barcode Scanning 1515, the controller 740 may perform control to display, on the first display 312, a screen 2000 for guiding insertion of a boarding pass into a ticket insertion slot 50.

In addition, the controller 740 may perform control to display, on the first display 312, a screen for guiding completed scanning and return of a ticket.

In addition, the moving robot 1 may display a scan result on the second display 21 to provide a user with gate information, counter information, etc. according to the scan result.

The controller 740 may perform control such that a recognition result of the ticket is displayed on the first display 312 whist information for guiding to a destination corresponding to the recognition result of the ticket is displayed on the second display 21.

If a ticket such as a boarding bass fails to be recognized, the controller 740 may perform control such that a screen for guiding a recognition failure is displayed on the first display 312.

Figure 21:
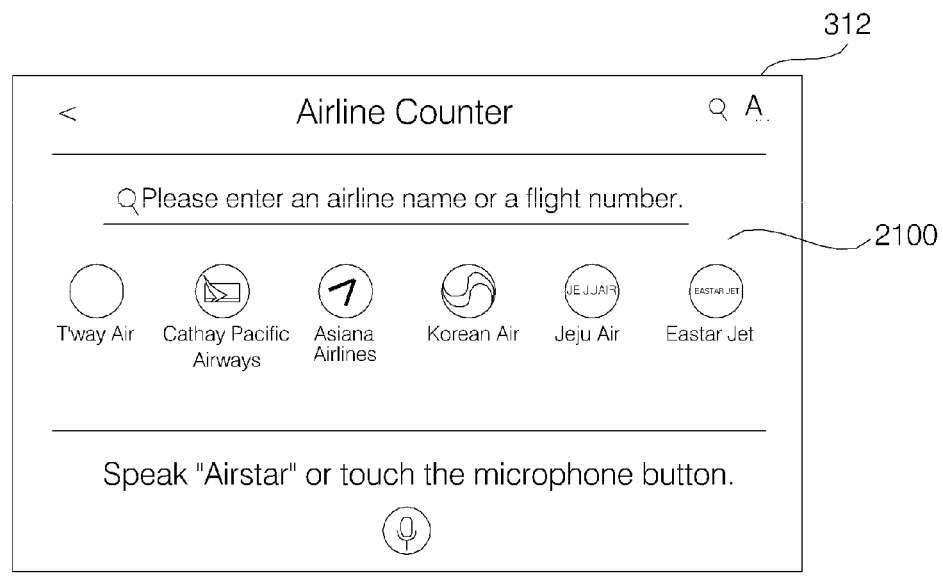

FIG. 21 shows an example of a screen displayed when Airline Counter 1612 is selected from among the main menu items.

Referring to FIG. 21, in response to selection of Airline Counter 1612, the controller 740 may perform control to display, on the first display 312, a screen 2100 for searching for and selecting an airline counter.

The screen 2100 may include a list of frequently asked airlines and a search window.

If the search window is selected, the controller 740 may further display a screen keyboard on the first display 312, and may provide an autocomplete function in response to a letter being input.

If one airline is selected from the list of frequently asked airlines or inputting a word through the search window is completed, the controller 740 may provide a search result as a pop-up window.

The search result may provide an airport map where the current location and a location of a found place are marked, and a list of airlines aligned in order of proximity to the current location.

In addition, the pop-up window including the search result may include a button for requesting a guide service.

Figure 22:

FIG. 22 shows an example of a screen displayed when a specific category such as Shopping 1511, Hotel/Lounge 1513, Restaurant 1514, Conveniences 1516 or 1613, Roaming 1611, etc. from the main menu items is selected.

Referring to FIG. 22, in response to selection of the specific category, the controller 740 may perform control to display, on the first display 312, a search screen 2200 including a search bar that enables a search for a place in the specific category.

Alternatively, the controller 740 may provide items included in the selected specific category in the form of a list.

In addition, the controller 740 may provide a list of sub-categories into which the items included in the selected specific category are re-classified by a predetermined standard, and may provide items included in the selected sub-category in the form of a list.

For example, if a user selects Shopping 1511, duty free shops, product types, and brands may be provided on a list of sub-categories, and items included in a selected sub-category may be provided in the form of a list.

Figure 23:
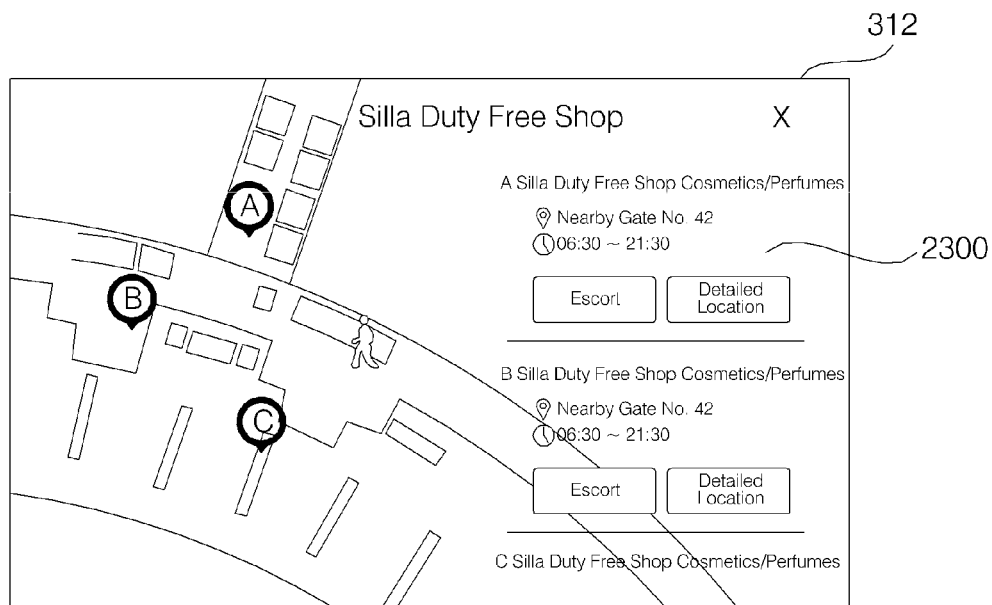

FIG. 23 shows an example of a search result screen.

Referring to FIG. 23, if one of provided items is selected or inputting a word through a search bar is completed, the controller 740 may perform control to display, on the first display 312, a search result screen 2300.

The search result screen 2300 may include an airport map, where the current location and locations of found places are marked, and a list of found places aligned in order of proximity to the current location.

In addition, the search result screen 2300 may include a detailed location button for checking detailed information, and a button (escort) for requesting a guide service.

If a user selects the detailed location button, an entire airport map, a destination location, a path to the destination, the current location of the user, and destination information (operating time) may be provided through the second display 21 of a large size.

If the user selects an escort button, an entire airport map, a destination location, a path to the destination, the current location of the user, a required time to arrive at the destination, and a distance to the destination may be provided through the second display 21 of a large size and an escort service may start.

FIGS. 24 to 27 are diagrams for explanation of a voice guide operation including a voice recognition process.

If a user touches a microphone icon displayed on a main screen or speaks a preset wake-up call, a voice guide operation may start.

Figure 24:
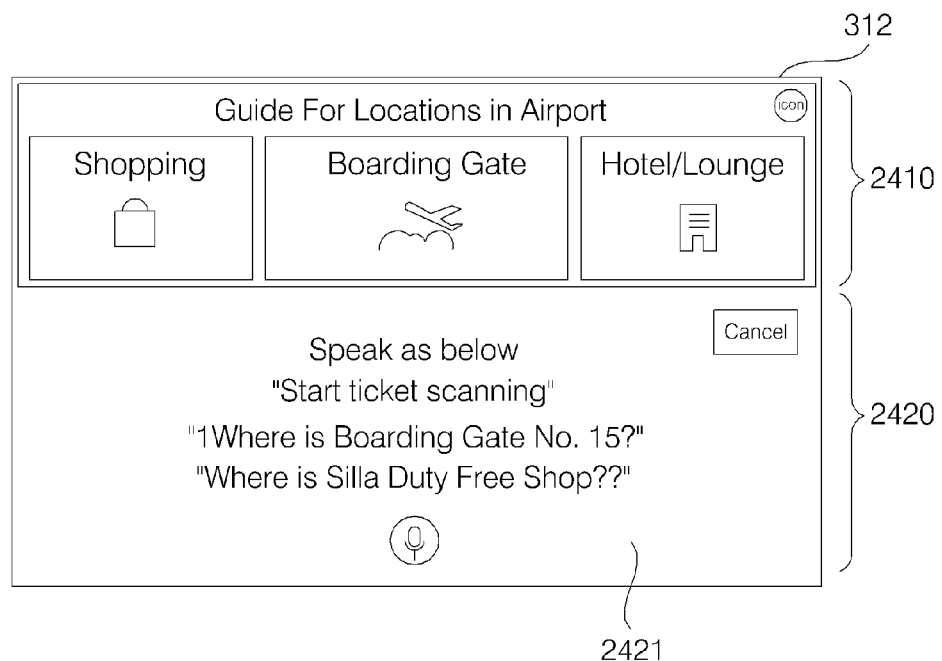

Referring to FIG. 24, the controller 740 may perform control to display an exemplary voice input guide 2421 in a voice recognition area 2420.

According to the exemplary voice input guide 2421, the user may input a desired destination through a voice in a similar way.

Meanwhile, upon the start of the voice guide operation, the controller 740 may increase the size of the voice recognition area 2420 and reduce the size of a main menu area 2410 on a main screen displayed on the first display 312.

Meanwhile, if a touch input is received through the first display 312 during a voice guide operation being executed in accordance with a voice input received through the voice input unit 725, the controller 740 may finish the voice guide operation and perform control to execute an operation corresponding to the touch input.

For example, if any item in the main menu area 2410 is touched during the voice guide operation, voice recognition may be automatically cancelled.

In addition, the controller 740 may perform control to execute an operation corresponding to the touched menu item.

Meanwhile, the moving robot 1 according to an embodiment of the present invention may determine volume of a user's speech, and volume of ambient noise.

Figure 25:
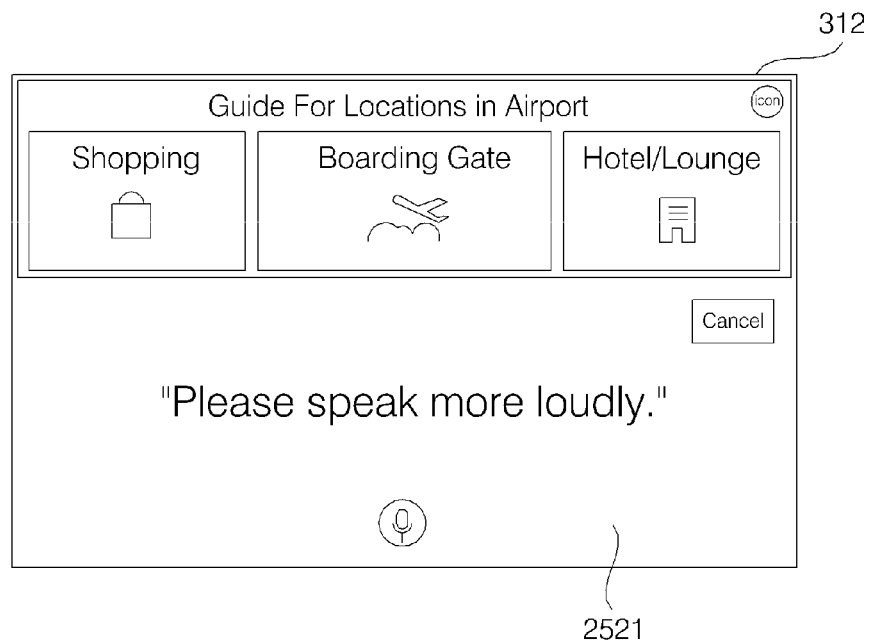

Referring to FIG. 25, if the user speaks too low, the controller 740 may perform control to display a message 2521 for guiding proper speaking volume, such as "Please speak more loudly".

Meanwhile, if voice recognition fails, the controller 740 may display a guide message such as "Please speak again", "Sorry, speak again please.", "Please cancel the voice guide and touch on the screen.", etc.

Figure 26:
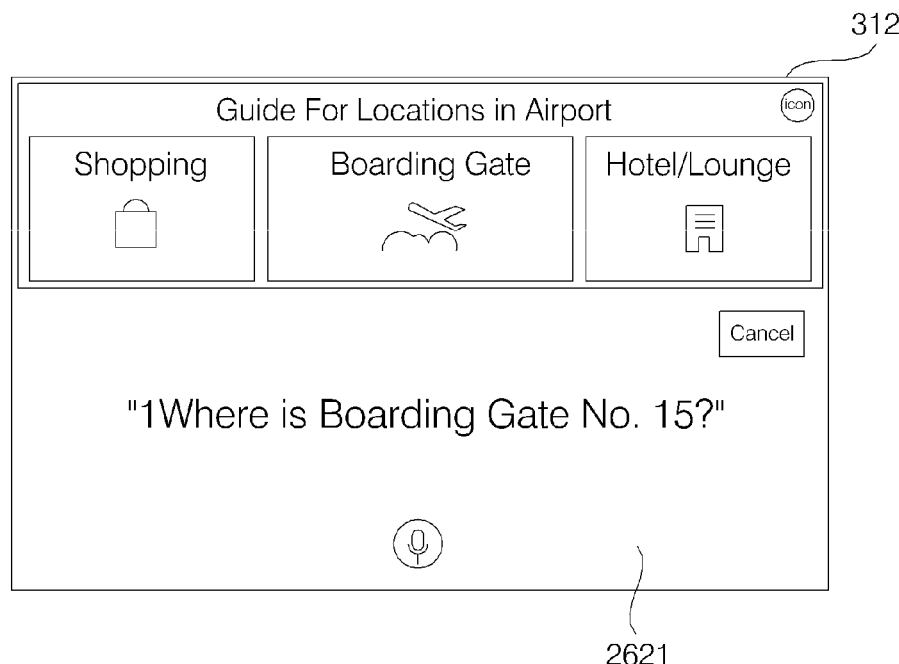

Referring to FIG. 26, if voice recognition is succeeded, the controller 740 may display a voice recognition result 2621 such as "Where is Gate No. 15?", so that a user can see the result.

Meanwhile, the controller 740 may perform control to display the voice recognition result 2621 for N seconds and then switch a screen displayed on the first display 312 to a search result screen of a destination corresponding to the voice recognition result 2621.

Meanwhile, if a voice recognition result corresponds to a service not allowed to provide even though voice recognition is succeeded, the controller 740 may perform control to display a guide message for informing a function not supported or information not allowed to guide.

Meanwhile, if noise with a volume equal to or greater than a predetermined level is sensed during a voice guide operation being executed in accordance with a voice input received through the voice input unit 725, the controller 740 may finish the voice guide operation and perform control to display, on the first display 312, a guide message for guiding a user to apply a touch input.

Figure 27:
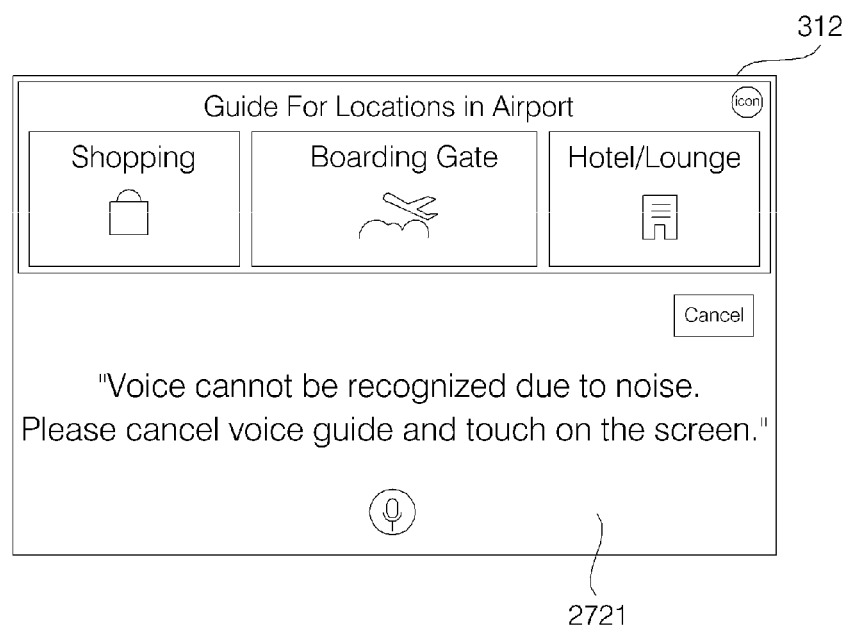

Referring to FIG. 27, if it is noisy in the surroundings, the controller 740 may perform control to display a message 2721 for guiding a touch input, such as "Voice cannot be recognized due to ambient noise. Please cancel the voice guide and touch on the screen.".

Meanwhile, if a guide request from a user is received through a touch input or a voice input, the controller 740 may perform control to escort the user to a selected guide destination.

Figure 28:
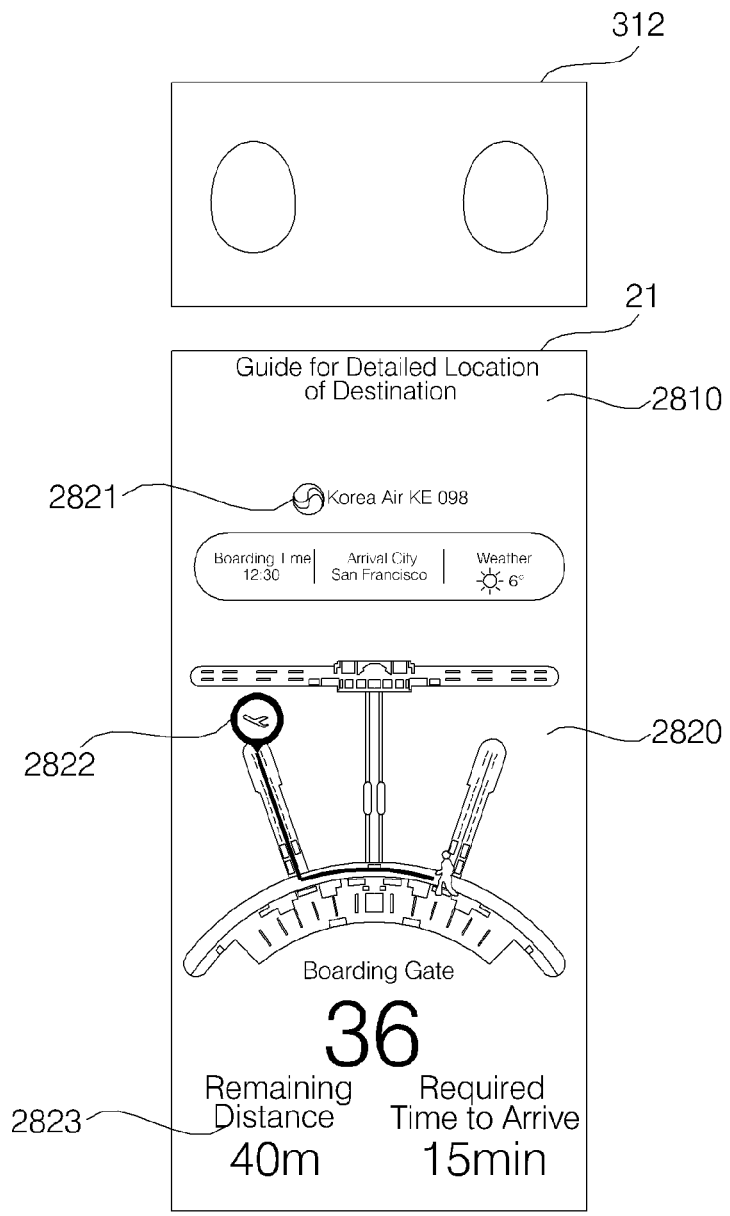

Referring to FIG. 28, in a robot guide mode for escorting a user to a guide destination selected by the user, a variety of guide information may be displayed on the second display 21 so that a user is able to check the information while following the moving robot 1 moving to the destination.

As detailed information and additional information are displayed on the second display 21 of a large size, it is possible to provide more information on a single screen and a user is allowed to see an entire airport map to thereby easily grasp a full path.

Referring to FIG. 28, the first display 312 may display an image representing a facial expression corresponding to a robot guide mode for escorting a user.

Referring to FIG. 28, a usage guide area 2810 of the second display 21 may display title information such as "Guide for Detailed Location of Destination", or may display a message for guiding a turn direction, current location information, a message for guiding temporary stop, and an approaching guide message such as "Follow me".

In addition, an information area 2820 of the second display 21 may display destination or search result information 2821, navigation information 2822 including a map screen, and guide information 2823 such as a remaining distance and a remaining time.

In the navigation information 2822, the current location and a location of a destination may be displayed on a map along with a path to the destination.

Figure 29:
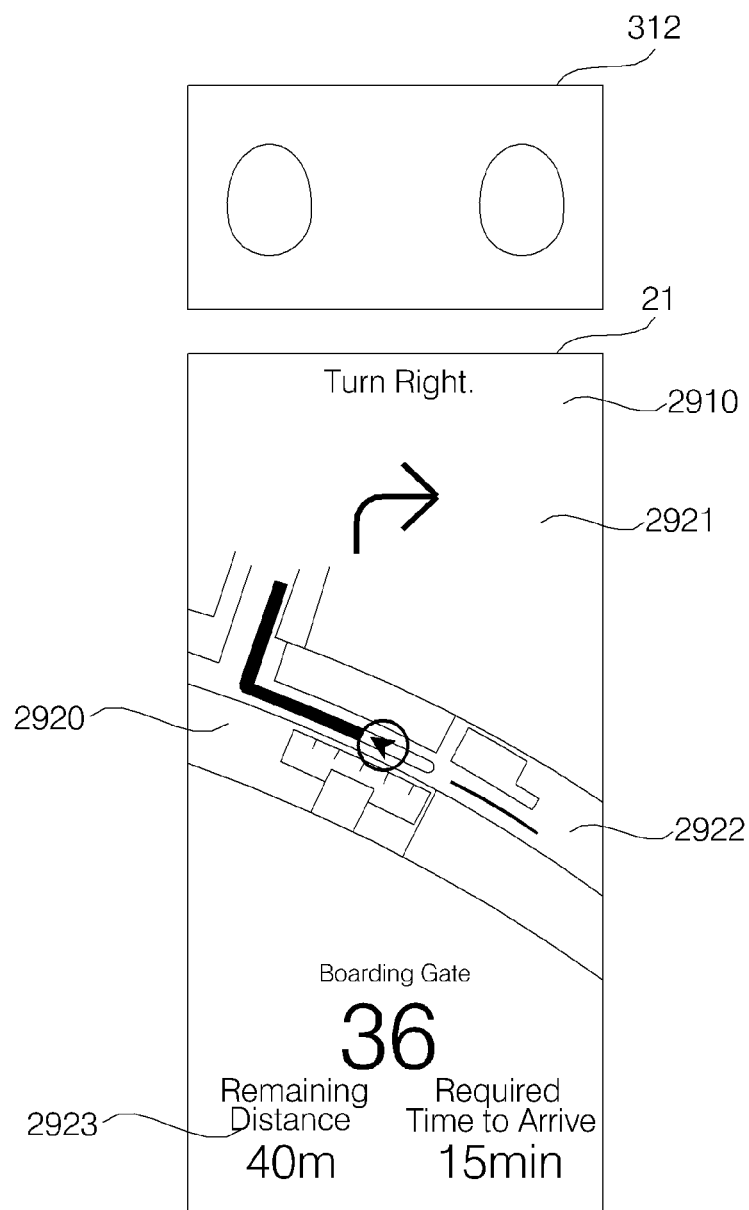

Referring to FIG. 29, the controller 740 may reduce or enlarge the map screen of the navigation information 2922.

For example, when the moving robot turns around a corner or a predetermined event occurs, the controller 740 may perform control to enlarge a map.

Meanwhile, the controller 740 may rotate the map screen of the navigation information 2922 around the current location.

Referring to FIG. 29, in the case of a right turn, the controller 740 may display a message for guiding the right turn, such as "Turn Right", in a usage guide area 2910 of the second display 21, and a graphic image 2921 corresponding to the right turn in an image area 2920.

In addition, the controller 740 may perform control such as the guide information 2923 such as a remaining distance to the destination and a remaining time to arrive at the are updated in real time to be displayed on the information area 2920.

Figure 30:
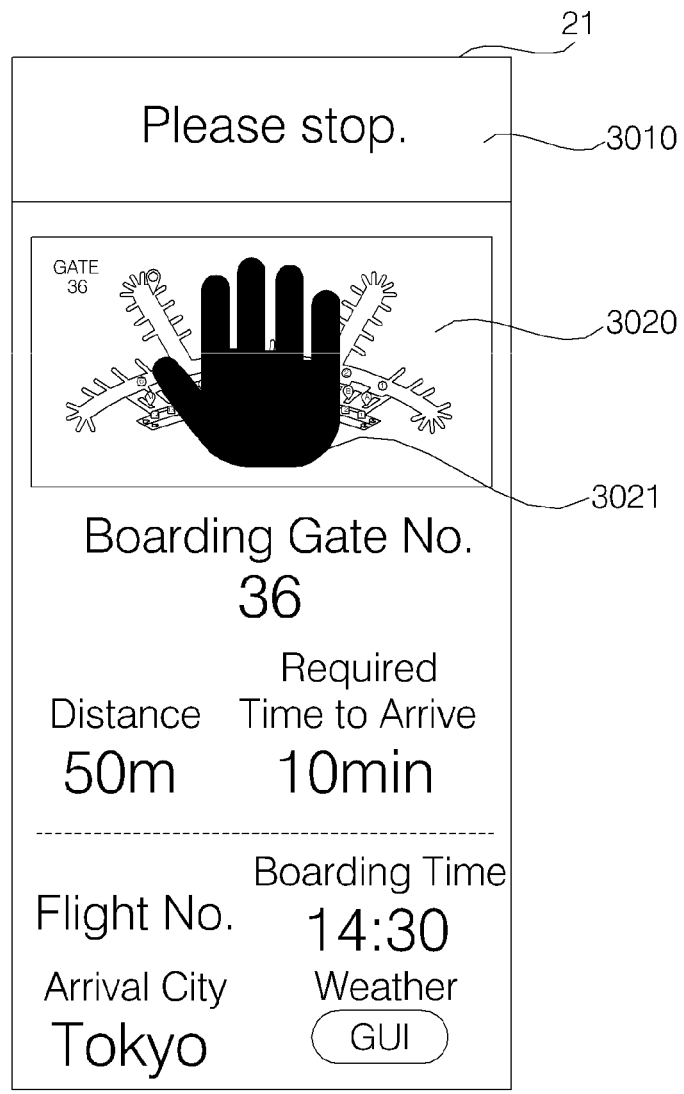

Referring to FIG. 30, if it is required to stop due to approaching of a moving obstacle, a guide message 3010, such as "Please stop", may be displayed on the second display 21, and a graphic image 3021 indicative of STOP may be displayed over guide information 3020.

Figure 31:
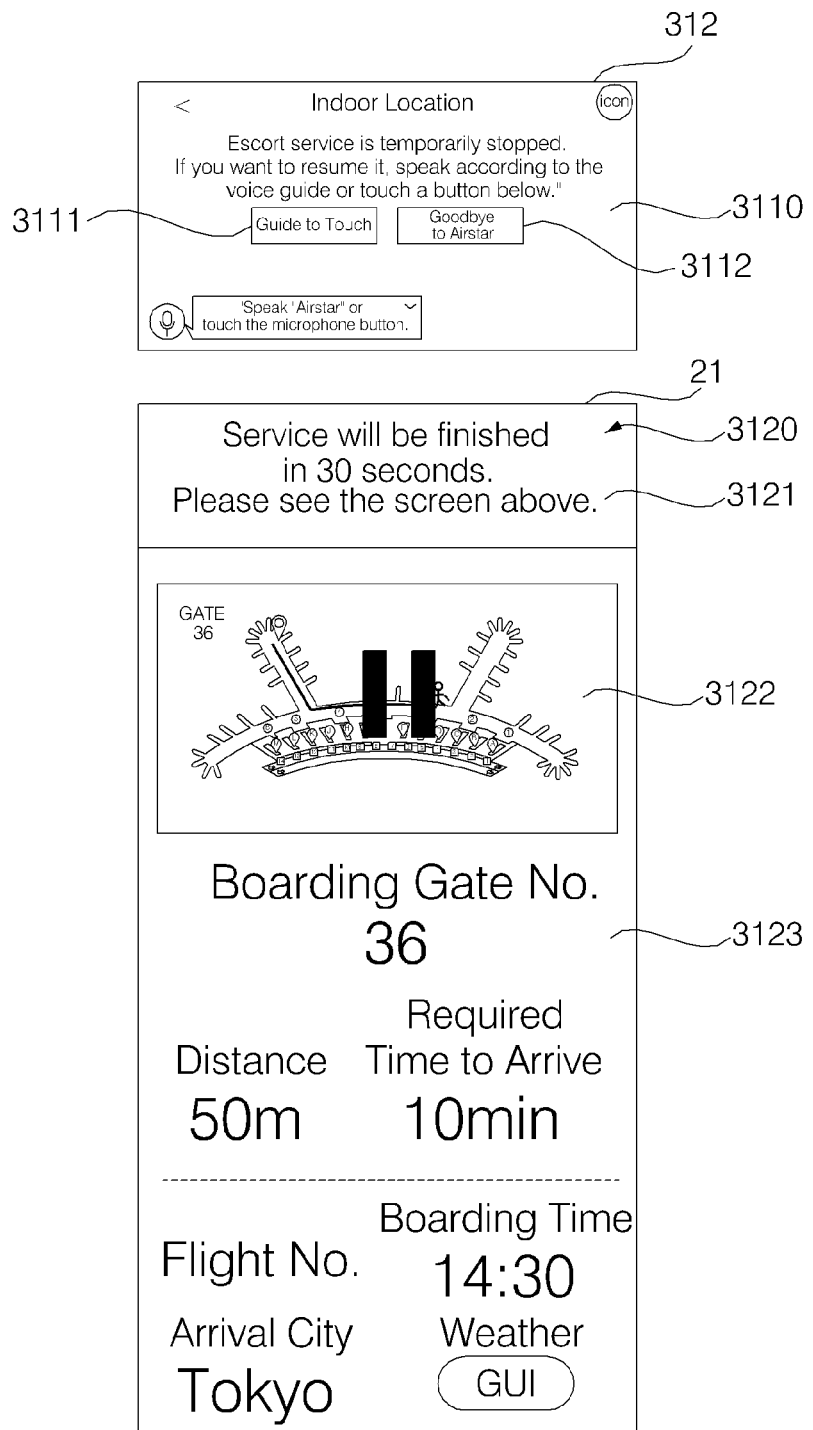

Referring to FIG. 31, if the moving robot 1 stops temporarily, the controller 740 may perform control to display, on the first display 312, a guide resumption trigger screen 3110 to select whether to start a guide service again or whether to finish a guide service.

The guide resumption trigger screen 3110 may include a guide message such as "Escort service is temporarily stopped. If you want to resume it, speak according to the voice guide or touch a button below.".

In addition, the guide resumption trigger screen 3110 may include a guide resumption button 3111 for requesting guide resumption, and a finish button 3112 for finishing a guide service.

Meanwhile, the controller 740 may perform control to display, on the second display 21, a message 3121 for guiding stopping of a guide service, end of a guide service, and checking of the first display 312, a graphic image 3122 indicative of temporary stop, and a screen 3120 including up-to-date guide information 3123.

Meanwhile, the controller 740 may rotate the head to align the first display and the second display so that a user following the moving robot is able to see both the guide resumption trigger screen 3110 displayed on the first display 312 and the screen 3120 displayed on the second display 21.

If the user requests a guide service again through a touch input or a voice input, the moving robot 1 may resume escorting the user, and, if not, the moving robot 1 may finish escorting the user and return back to the home or a preset place.

Figure 32:
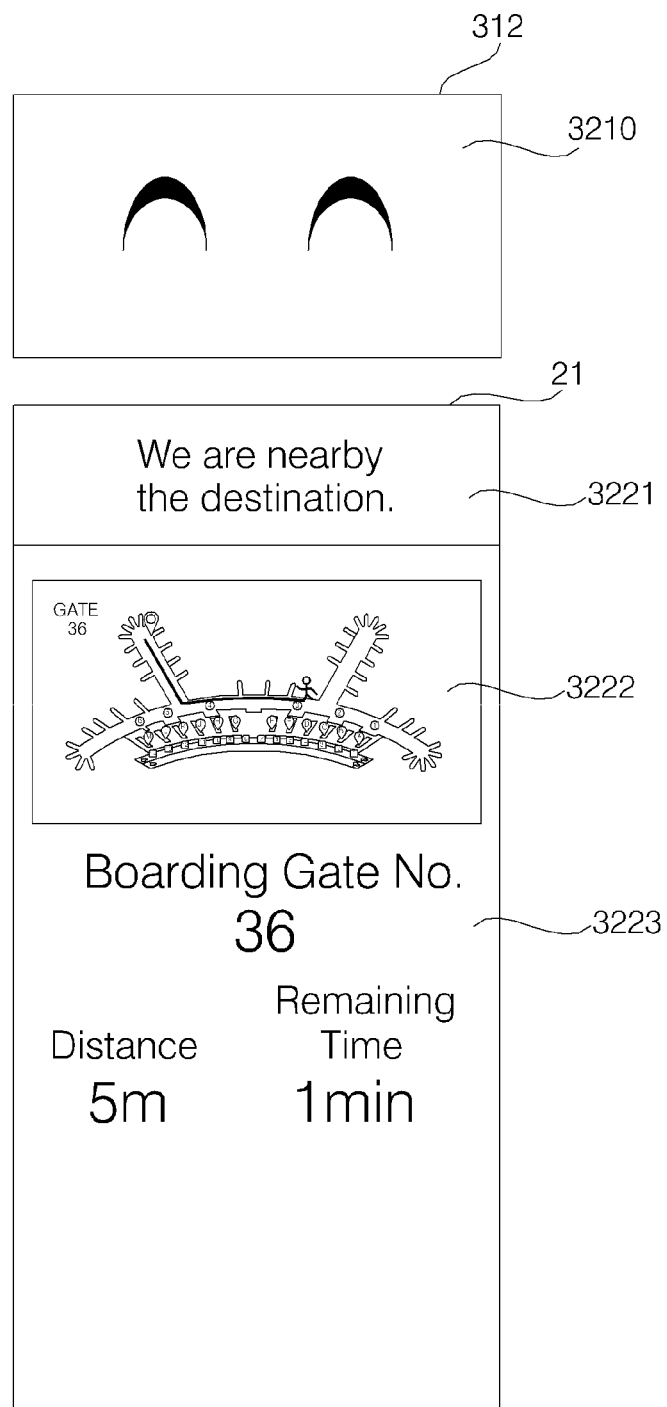

Referring to FIG. 32, if the moving robot 1 arrives in proximity to a guide destination, a screen corresponding to arrival of the destination may be displayed on the display 312 and 21.

For example, the first display 312 may display a screen 3210 representing a facial expression corresponding to the arrival of the destination.

In addition, the second display 21 may display a guide message 3221 for informing proximity to the destination, navigation information 3222 including a map screen, and remaining distance and time information 3223.

Meanwhile, when arriving at the guide destination, the moving robot 1 may guide the arrival at the destination and may execute photographing, service evaluation, etc. according to a voice input or a touch input by a user.

For example, if a user selects photographing, it is possible to take a photo of the user using a camera included in the image acquisition unit 720.

Upon arrival at a predetermined guide destination, the controller 740 may display a screen for guiding photographing on the first display 312, and, if a user selects photographing, the controller 740 may perform control to display a camera view screen of a camera on the second display 21.

Figure 33:
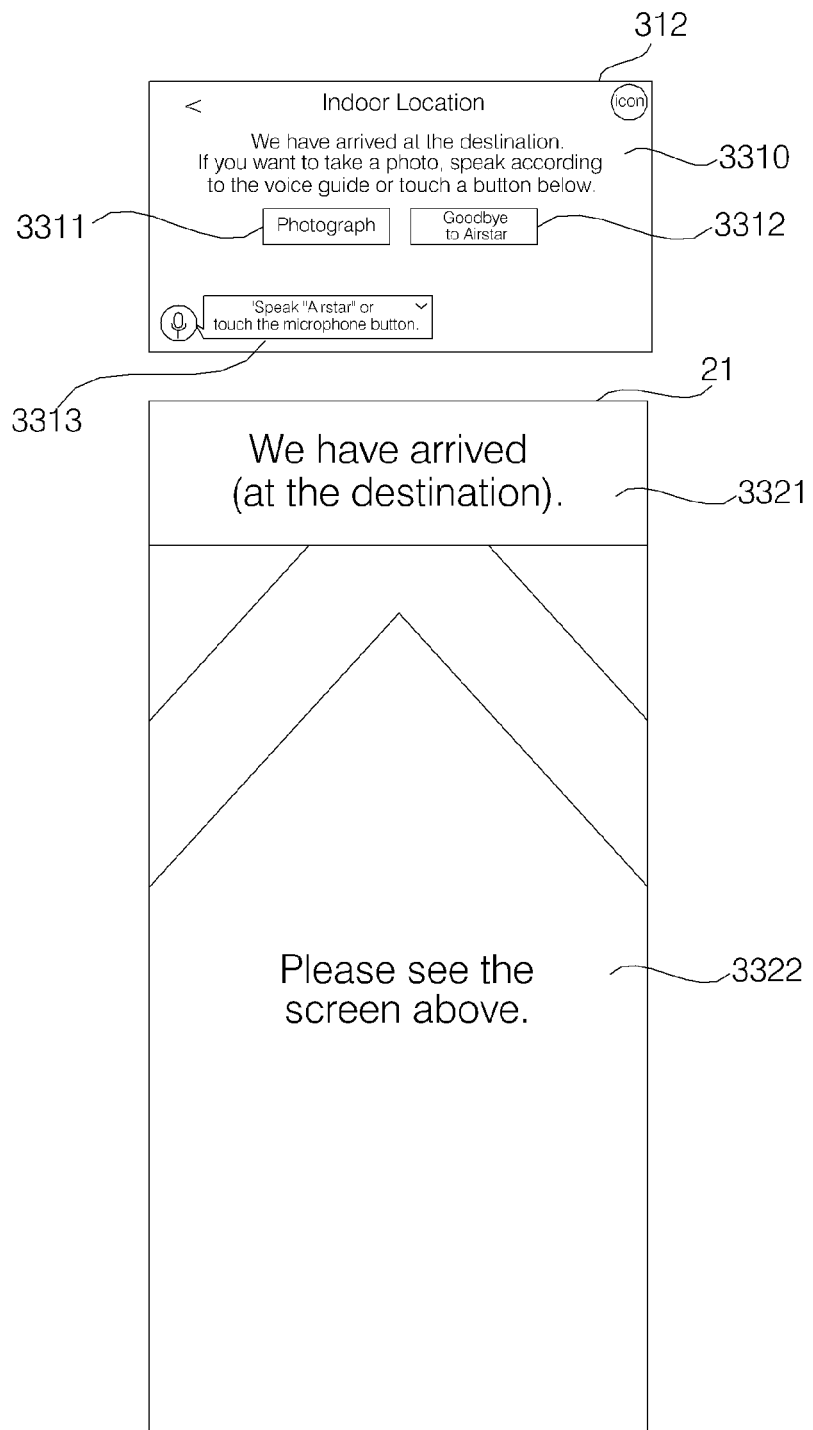

Referring to FIG. 33, upon arrival at a destination, the moving robot 1 may display, on the second display 21, a message 3321 for informing the arrival at the destination and a screen 3322 for guiding checking of the first display 312.

In addition, the first display 312 may display a photography guide screen 3310 that includes a guide message such as "We have arrived at the destination. If you want to take a photo, speak according to the voice guide or touch a button below.".

The photography guide screen 3310 may include a photographing button 3311 for selecting photographing, and a finish button 3312 for finishing without photographing.

In addition, the photography guide screen 3310 may include a voice recognition button and a voice trigger guide 3313.

Meanwhile, if a user selects photographing through a touch input or a voice input, a camera view screen of a camera may be displayed on the second display 21. Here, the camera view screen may indicate a screen as currently seen from the camera.

Figure 34A:
Figure 34B:

Referring to FIGS. 34A, the second display 21 may display a guide message for an action for photographing control, and a camera view screen 3410.

Meanwhile, the first display 312 may display a guide message for photographing preparation, and a screen for guiding checking of the second display 21.

In addition, if photographing is activated by a two-step action of opening a hand palm and making a first, the second display 21 may display a message for guiding the second action and a camera view screen 3420.

Figure 34C:
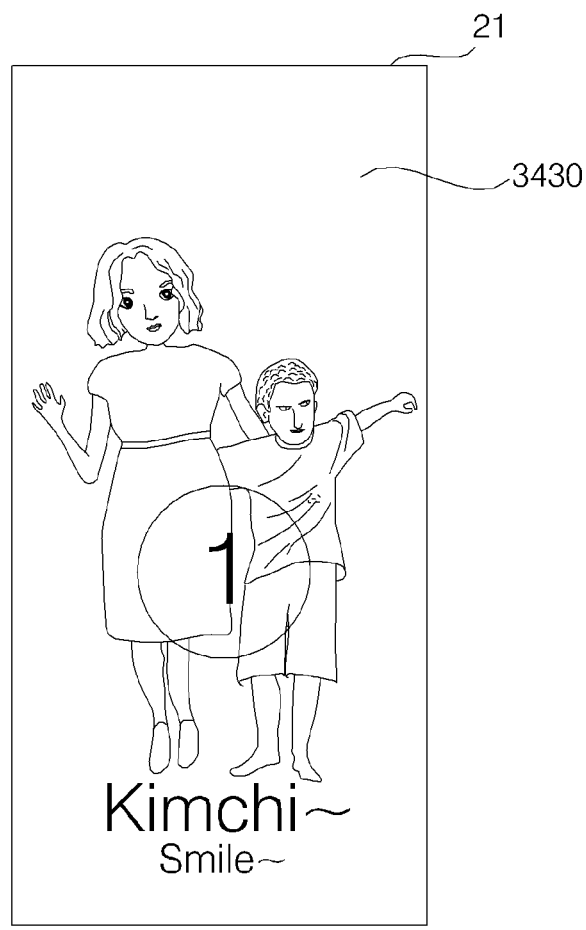

Referring to FIG. 34C, the second display 21 may display a countdown for notifying a photographing timing, and a camera view screen 3430.

Meanwhile, the controller 740 may display a taken photo on the first display 312 or the second display 21, and then control the communication unit 790 to transmit the taken photo to an email address according to selection of a user.

Figure 35:
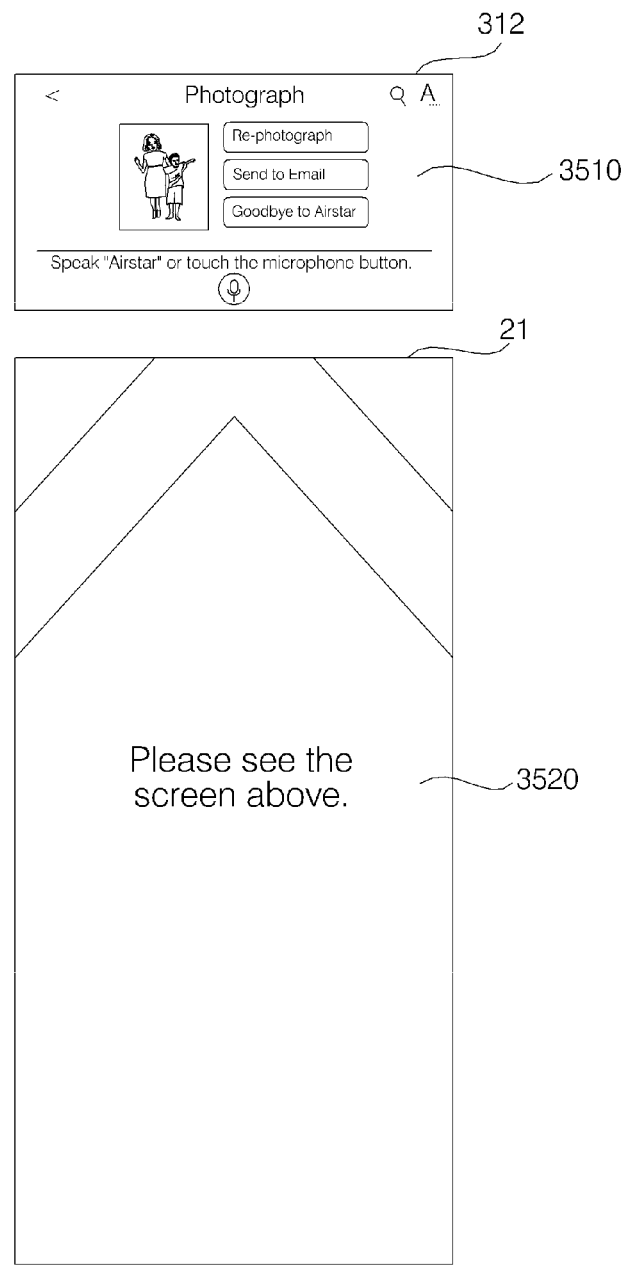

Referring to FIG. 35, the first display 312 may display a screen 3510 including a taken photo, a re-photographing button for requesting re-photographing, a button for sending the taken photo to an email address, and a guide finish button for finishing a guide service.

In addition, the second display 21 may display a screen 3520 for guiding to the screen 3510 displayed on the first display 312.

If the user selects the send-to-email button, the moving robot 1 may display an input window for inputting an email address, and transmit the taken photo to an email address input through the input window.

The user may be able to perform photographing while seeing a camera view screen in real time through the second display 21 allowed to be easily seen even at a distance.

In addition, after the photographing, manipulation such as sending to an email address may be allowed through the first display 312.

In addition, even during the photographing, a screen may be switched according to an interaction distance between the user and the robot and a content of interaction therebetween.

For example, if the user is located in proximity, manipulation such as sending a captured photo to an email address, requesting of re-photographing, etc. may be allowed through the first display 312, and, if the user is located far away, checking a camera view screen, taking a photo, and checking the taken photo may be allowed through the second display 21.

Figure 36:
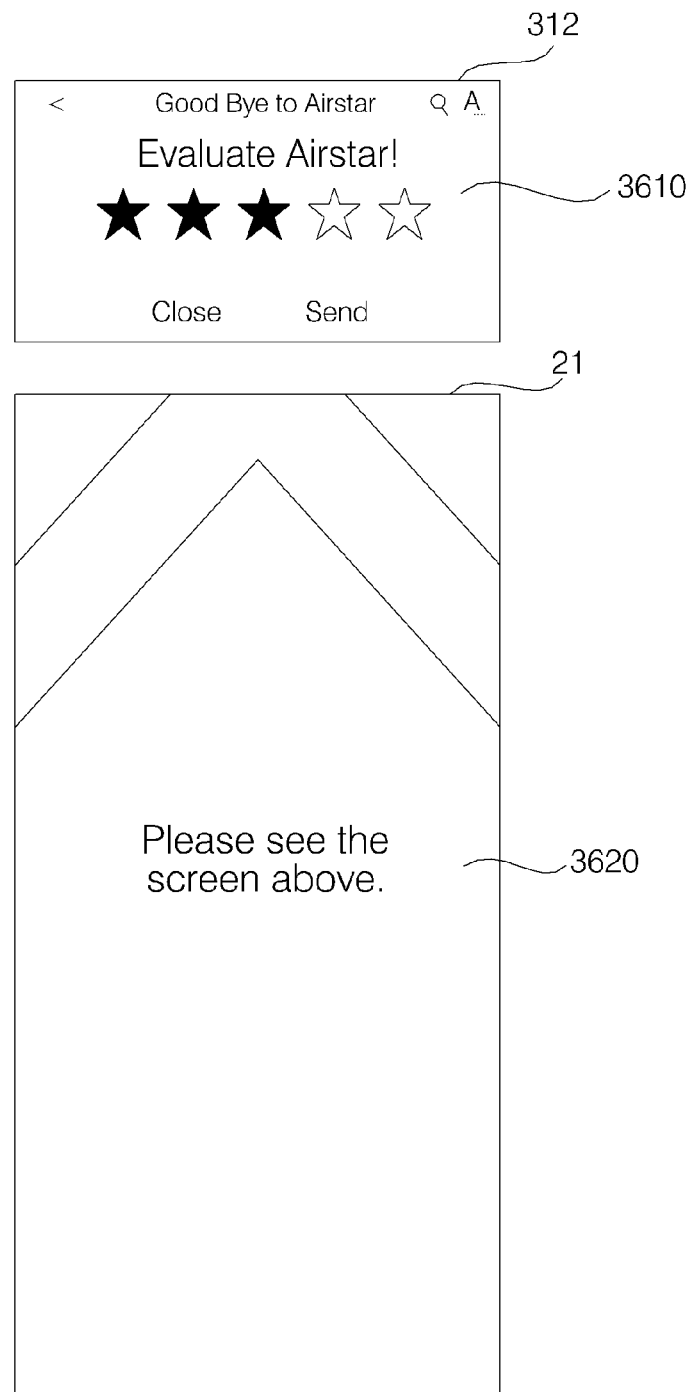

Referring to FIG. 36, if a user finishes a guide service by selecting a guide finish button or by applying a voice input, a service evaluation screen 3610 may be displayed on the first display 312 and a screen 3620 for guiding to the screen 3610 displayed on the first display 312 may be displayed on the second display 21.

After or without service evaluation, the user may finish the guide service.

When the guide service is finished, the moving robot 1 may travel to return back to the home or a preset place.

According to at least one of the embodiments of the present invention, it is possible to a variety of guide services in public places.

In addition, according to at least one of the embodiments of the present invention, it is possible to easily provide information displayed on a display in the course of providing a service such as wayfinding.

In addition, according to at least one of the embodiments of the present invention, it is possible to utilize two displays in various ways according to a type of information, an amount of the information, an interaction distance between a robot and a user, and sizes of the displays, thereby enhancing efficiency in providing the information and improving user convenience.

This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

Meanwhile, the operation method of the moving robot according to an embodiment of the present invention may be implemented in a recording medium, which may be read by a processor provided in a network device, as a code that can be read by the processor. The recording medium that can be read by the processor includes all kinds of recording media in which data that can be read by the processor are stored. Examples of the recording medium include a ROM, a RAM, a CD-ROM, a magnetic tape, a floppy disk, and an optical data memory, and another example of the recording medium may be implemented in a shape of carrier wave such as transmission through Internet. Also, the recording medium that can be read by the processor may be distributed in a computer system connected thereto through the network, whereby codes that can be read by the processor may be stored and implemented in a distributive mode.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims, and such modifications, additions and substitutions should also be understood to fall within the scope of the present disclosure.

What is claimed is:

1. A moving robot comprising:
   a top cover;
   a middle cover disposed below the top cover and including a first cut-open portion and a second cut-open portion;
   a front lidar disposed in a position corresponding to the first cut-open portion;
   a rear lidar disposed in a position corresponding to the second cut-open portion;
   a first display; and
   a second display spaced apart from the first display,
   wherein the second display is disposed in a rear section of the middle cover, and wherein a lower end of the second display is positioned above the second cut-open portion.

2. The moving robot of claim 1, wherein the first cut-open portion and the second cut-open portion are spaced apart from each other in an upward and downward direction.

3. The moving robot of claim 1, wherein the first cut-open portion is positioned above the second cut-open portion.

4. The moving robot of claim 1, wherein the first cut-open portion is formed from a front section to a side section on an outer circumferential surface of the middle cover, and
wherein the second cut-open portion is formed from a rear section to a side section on the outer circumferential surface of the middle cover.

5. The moving robot of claim 1, wherein the middle cover has a diameter that increases from top to bottom.

6. The moving robot of claim 1, wherein the front lidar and the rear lidar are disposed within the middle cover,
wherein the front lidar is exposed to the outside through the first cut-open portion, and
wherein the rear lidar is exposed to the outside through the second cut-open portion.

7. The moving robot of claim 1, wherein the second display is a curved display having a slope that increases from top to bottom.

8. The moving robot of claim 1, wherein first display is disposed in the top cover.

9. The moving robot of claim 1, wherein the middle cover includes a first middle cover positioned below the top cover, and a second middle cover positioned below the first middle cover, and
wherein the first cut-open portion and the second cut-open portion are disposed in the second middle cover.

10. The moving robot of claim 1, further comprising:
a voice input unit configured to receive a voice input of a user; and
a controller configured to, in response to receiving the voice input or a touch input received to the first display or the second display, selectively display a screen on at least one of the first display or the second display based on a type and an amount of information included in the screen.

11. The moving robot of claim 10, wherein the controller is further configured to:
sequentially display, on the second display, a boarding gate map screen including guiding information for locations of airplane boarding gates and an advertising screen including one or more advertising images while in an air side mode or when the moving robot is located on an air side of an airport; and
sequentially display, on the second display, a counter map screen including information for guiding locations of counters in a land side of the airport, a representative counter guide screen including information for guiding locations of counters of representative airlines, and an advertising screen including one or more advertising images while in a land side mode or when the moving robot is located on a land side of the airport.

12. The moving robot of claim 10, wherein the controller is further configured to:
in response to the distance between the moving robot and the user being greater than a predetermined distance, display the predetermined information on the second display; and
in response to the distance between the moving robot and the user being less than or equal to the predetermined distance, display the predetermined information on the first touchscreen display.

13. The moving robot of claim 1, further comprising a driving unit configured to move the moving robot,
wherein the controller is further configured to rotate the rotatable head upon movement of the moving robot.

* * * * *